(12) United States Patent
Chaar et al.

(10) Patent No.: US 12,086,841 B2
(45) Date of Patent: *Sep. 10, 2024

(54) CROSS-PLATFORM PROPOSAL CREATION, OPTIMIZATION, AND DEAL MANAGEMENT

(71) Applicant: Turner Broadcasting System, Inc., Atlanta, GA (US)

(72) Inventors: Wassim Samir Chaar, Coppell, TX (US); José Antonio Carbajal Orozco, Atlanta, GA (US); Andreea Popescu, Atlanta, GA (US); Peter Alexander Williams, Atlanta, GA (US); David James Benoit, Fayetteville, GA (US); Lawrence Herbert Allen, II, Cordlandt Manor, NY (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,202

(22) Filed: May 23, 2023

(65) Prior Publication Data

US 2023/0419369 A1 Dec. 28, 2023

Related U.S. Application Data

(63) Continuation of application No. 17/206,670, filed on Mar. 19, 2021, now Pat. No. 11,669,871, which is a
(Continued)

(51) Int. Cl.
*G06Q 30/02* (2023.01)
*G06Q 30/0241* (2023.01)
*G06Q 30/0242* (2023.01)

(52) U.S. Cl.
CPC ..... *G06Q 30/0276* (2013.01); *G06Q 30/0246* (2013.01); *G06Q 30/0247* (2013.01)

(58) Field of Classification Search
CPC ............... G06Q 30/02; G06Q 30/0276; G06Q 30/0246; G06Q 30/0247; G06Q 30/0254; G06Q 10/067; G06Q 30/0207
See application file for complete search history.

(56) References Cited

U.S. PATENT DOCUMENTS

| 9,842,353 | B1 | 12/2017 | Sivertsen |
| 10,970,751 | B2 | 4/2021 | Chaar et al. |

(Continued)

FOREIGN PATENT DOCUMENTS

| EP | 2179348 A1 * | 4/2010 | ............... G06F 7/00 |
| EP | 2257863 A2 | 12/2010 | |

(Continued)

OTHER PUBLICATIONS

Tim Francis; Peter Crocker, Smarter Analytics: Increase Business Success by Applying IBM Business Analytics and IBM Smarter Commerce Solutions (Englsih), IBM Redbooks Redguide, Sep. 26, 2013 (Year: 2013).*

(Continued)

*Primary Examiner* — Marilyn G Macasiano
(74) *Attorney, Agent, or Firm* — ALSTON & BIRD LLP

(57) ABSTRACT

A system is provided for cross-platform proposal creation, optimization, and deal management. The system generates a proposal plan corresponding to a distribution of target audience across a set of delivery platforms based on an adjustment of a request parameter associated with a request. The proposal plan is executed for a first time period in a flight on a first delivery platform from the set of delivery platforms based on a plurality of client-defined requirements corresponding to the request. The proposal plan is optimized for a second time period in the flight by an in-flight re-distribution of the target audience across the set of delivery platforms. Execution of the optimized proposal plan is
(Continued)

controlled for the second time period in the flight on the first delivery platform.

19 Claims, 12 Drawing Sheets

Related U.S. Application Data continuation of application No. 16/128,444, filed on Sep. 11, 2018, now Pat. No. 10,970,751.

(60) Provisional application No. 62/556,617, filed on Sep. 11, 2017.

(56) References Cited

U.S. PATENT DOCUMENTS

| | | | |
|---|---|---|---|
| 11,392,986 B2* | 7/2022 | Lefkofsky | G06Q 30/0257 |
| 11,669,871 B2 | 6/2023 | Chaar et al. | |
| 2003/0052828 A1* | 3/2003 | Scherzer | H01Q 5/42 |
| | | | 343/795 |
| 2011/0184800 A1* | 7/2011 | Kokernak | G06Q 30/0201 |
| | | | 705/14.41 |
| 2013/0212619 A1 | 8/2013 | Yerli | |
| 2014/0019260 A1 | 1/2014 | Borah | |
| 2014/0257935 A1* | 9/2014 | Killoh | G06Q 30/0276 |
| | | | 705/7.35 |
| 2015/0227982 A1 | 8/2015 | Soupliotis et al. | |
| 2018/0059288 A1 | 3/2018 | Ishizu et al. | |
| 2018/0225709 A1 | 8/2018 | Ferber et al. | |
| 2019/0080365 A1 | 3/2019 | Chaar et al. | |
| 2021/0295376 A1 | 9/2021 | Chaar et al. | |

FOREIGN PATENT DOCUMENTS

| | | | | |
|---|---|---|---|---|
| EP | 2944079 A2 * | 11/2015 | | H04N 7/10 |
| KR | 2007-0038027 A * | 4/2007 | | H04N 7/173 |
| WO | WO 2000/051335 A2 * | 8/2000 | | G06Q 30/00 |
| WO | WO 2003/021501 A2 * | 3/2003 | | G06Q 10/00 |
| WO | WO 2008/021409 A2 * | 2/2008 | | G06Q 30/02 |
| WO | 2009/099876 A2 | 8/2009 | | |

OTHER PUBLICATIONS

Tiago Nogueira; Simone Fratini; Klaus Schilling, Autonomously controlling flexible timelines: From domain-independent planning to robust execution (Englsih), 2017 IEEE Aerospace Conference (pp. 1-15), Mar. 1, 2017 (Year: 2017).*

Chuck Bullard; Fabio Hasegawa; Gord Owens; Soren Ravn Pedersen; Klaus Subtil, Moving Forward with the On Demand Real-time Enterprise (English), IBM Redbooks Publication (Archived) Sep. 28, 2006 (Year: 2006).*

Mukaddim Pathan; Ramesh K. Sitaraman; Dom Robinson, Cloud-Based Content Delivery and Streaming (English), Advanced Content Delivery, Streaming , and Cloud Services, Wiley-IEEE Press 2014 (Edition: 1, p. 710), Jan. 1, 2014 (Year: 2014).*

Richard E. Chatwin, An overview of computational challenges in online advertising (English), 2013 American Control Conference (pp. 5990-6007), Oct. 18, 2013 (Year: 2013).*

Lopez-Nores, Martin et al. "Augmented Reality, Smart Codes and Cloud Computing For Personalized Interactive Advertising On Billboards (English)," 2015 10th International Workshop on Semantic and Social Media Adaptation and Personilization (SMAP), Jan. 22, 2016 (Year: 2016), DOI: 10.1109/SMAP.2015.7370082.

NonFinal Office Action for U.S. Appl. No. 16/128,444, dated Jun. 24, 2020, (7 pages), United States Patent and Trademark Office, US.

Notice of Allowance for U.S. Appl. No. 16/128,444, dated Dec. 2, 2020, (12 pages), United States Patent and Trademark Office, US.

Reifer, Donald J. "Software War Stories: Case Studies in Software Management (English)," Wiley-IEEE Press 2013 (Edition: 1, pp. 288), Jan. 1, 2013 (Year: 2013).

Vera, Jorge et al. "Consumer Involvement As A Covariant Effect In Rethinking The Affective-Cognitive Relationship In Advertising Effectiveness," vol. 20, Issue 2, pp. 208-224, Mar. 7, 2019, (Year: 2019), Vilnius Gediminas Technical University, DOI: 10.3846/jbem.2019.8099.

U.S. Appl. No. 17/206,670, filed Mar. 19, 2021, U.S. Pat. No. 11,669,871, Issued.

U.S. Appl. No. 16/128,444, filed Sep. 11, 2018, U.S. Pat. No. 10,970,751, Issued.

* cited by examiner

PACING MODEL 402

Mix Share by Percentage

| Time | M1 | M2 | M3 |
|---|---|---|---|
| t-2 | 50 | 30 | 20 |
| t-1 | 45 | 40 | 15 |
| t | 0 | 5/60 | 6/40 |
| t+1 | 25 | 30 | 45 |
| t+2 | | | |
| t+3 | | | |
| t+n | | | |

FIG. 4

CROSS-PLATFORM PROPOSAL CREATION, OPTIMIZATION, AND DEAL MANAGEMENT

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 17/206,670, filed on Mar. 19, 2021, which is further a Continuation Application of U.S. Pat. No. 10,970,751, issued on Apr. 6, 2021, which claims benefit from U.S. Provisional Application Ser. No. 62/556,617, which was filed on Sep. 11, 2017.

The above referenced Application is hereby incorporated herein by reference in its entirety.

FIELD OF TECHNOLOGY

Various embodiments of the disclosure relate to a cross-platform management system. More specifically, various embodiments of the disclosure relate to a system and method for cross-platform proposal creation, optimization, and deal management.

BACKGROUND

Recent advancements in accessibility of data on multiple communication platforms has pushed for distribution of audience on these communication platforms. Examples of such communication platforms may include, for example, a linear platform (such as a television), a mobile platform (such as smartphones, tablet, wearables, handheld devices, and computers), and a digital platform (such as personal computers, gaming consoles and social platform). Such distribution of audience has led to an evolution in traditional marketing and platform-based advertisement campaigns (such as social media marketing campaigns, digital marketing campaigns, television marketing campaigns and the like).

Traditionally, such advertisement campaigns are independently managed on different platforms to achieve various goals of an advertiser, a promoter, or a brand owner. Examples of such goals include reach of target audience, impressions, sales, outcome, brand promotion and the like. In certain scenarios, a promoter may wish to shift the target audience and budget requirements from one platform to another platform, for example from a mobile platform to a linear platform or from a linear platform to a digital platform. However, current systems are inefficient for optimally shifting the target audience with due considerations of different costs, budget, and associated constraints. Thus, there may be required an optimal system to address the aforesaid problems.

Further limitations and disadvantages of conventional and traditional approaches will become apparent to one of skill in the art, through comparison of such systems with some aspects of the present disclosure as set forth in the remainder of the present application with reference to the drawings.

SUMMARY

Systems and/or methods are provided for cross-platform proposal and deal management, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 4 illustrates an exemplary pacing model, in accordance with an embodiment of the disclosure.

DESCRIPTION

Various embodiments of the disclosure may be found in a system and a method for cross-platform proposal creation, optimization, and deal management. Rapidly-changing technologies in media sector is redefining how advertisement content is created, consumed, delivered, and tracked. Examples of the advertisement content may include, but are not limited to digital videos, streaming banners, images, three-dimensional (3D) or two-dimensional (2D) computer graphics content, animation, brand jingles, snippets of information, audio-visual content, or other advertising media. Nowadays, advertisers, promoters, or brand owners want to create more focused advertising campaigns that target better customers that will be exposed to them. Further, such advertisers, promoters, or brand owners do not want to restrict their advertisement campaigns and consumption of their desired advertisement content via a single delivery platform, for example, a linear delivery platform (such as a television-based distribution). However, current systems are inefficient for optimally managing allocation, scheduling, and delivery of advertisement content at multiple delivery platforms at the same time with due considerations of different costs, budget, gross impressions, and associated constraints. This is turn is making advertisement content scheduling and delivery more resource intensive, error prone right from the planning stage to the delivery stage and has significantly increased uncertainties in achieving client objectives.

Various embodiments of the disclosure may comprise a cross-platform management system that not only solves the aforesaid problems but provides a technological solution to improve convergence of various delivery platforms and associated devices for providing extended consumption of advertisement content across multiple delivery platforms with due considerations to multiple objectives to be achieved. The ability of the disclosed cross-platform management system to optimally manage distribution of target audience across multiple delivery platforms during a flight also enables better signaling of audience preferences back to the advertisers, promoters, and brand owners.

Figure 1:
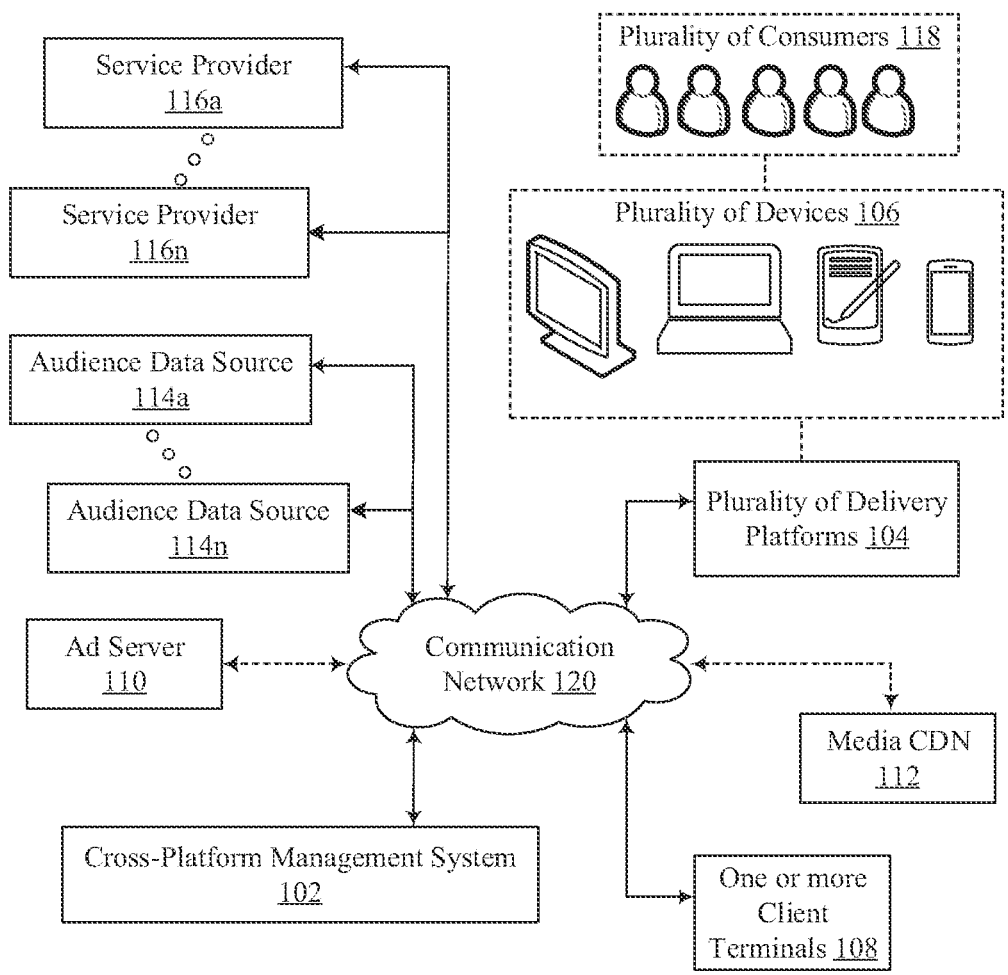
FIG. 1 is a functional diagram that illustrates an exemplary network environment for cross-platform proposal and deal management, in accordance with an exemplary embodiment of the disclosure.

FIG. 1 is a functional diagram that illustrates an exemplary network environment for cross-platform proposal and deal management, in accordance with an exemplary embodiment of the disclosure. The network environment in the FIG. 1 may include a cross-platform management system 102, a plurality of delivery platforms 104, a plurality of devices 106, one or more client terminals 108, an advertisement (Ad) server 110, a media content delivery network (CDN) 112, audience data sources 114a, . . . , 114n, service providers 116a, . . . , 116n, and a communication network 120. A plurality of consumers 118 may be associated with the plurality of devices 106. The cross-platform management system 102 may be communicatively coupled, via the communication network 120, to at least one of the one or more client terminals 108, the ad server 110, the media CDN 112, the audience data sources 114a, . . . , 114n, the service providers 116a, . . . , 116n, and the plurality of delivery platforms 104.

The cross-platform management system 102 may comprise suitable logic, circuitry, and interfaces that may be configured to perform management of one or more client-defined requirements of the one or more clients on the plurality of delivery platforms 104. In other words, the cross-platform refers to different media delivery platforms or channels through which content may be distributed for end-user consumption. The cross-platform management system 102 may be implemented as computer programmable instructions, in conjunction with computational components, such as a processor, on a local or cloud server. The management of the one or more client-defined requirements corresponds to business and/or social objective of the client. For example, a client-defined requirement may correspond to a reach of a brand to a desired number of users, such as "100,000 users" on a mobile device, and a desired number of impressions, such as "100,000 impressions", for an advertisement content on a television. The cross-platform management system 102 may be a distributed block (logical or instructional) of multiple interconnected subsystems for optimal management of the one or more client-defined requirements in a defined time duration.

The plurality of delivery platforms 104 may include, but are not limited to, a linear delivery platform (such as a television), a digital delivery platform (such as applications on personal computers, gaming consoles, social platforms, connected home appliances/devices, or emails), and a mobile delivery platform (such as a smart device including smartphones, handheld devices, wearable devices, or a tablet). In general, a delivery platform corresponds to a platform that provides an interface of an application, activity, a broadcast, page, or media stream accessible on a specific type of delivery device. Each delivery device of the plurality of devices 106 may correspond to a delivery platform of the plurality of delivery platforms 104. Examples of the plurality of devices 106 may include, but are not limited to, a mobile phone, a laptop, a desktop, a display device, a wearable device, and a television. Additionally, the plurality of devices 106 may also include a household device, such as refrigerator or a microwave in facility, such as a residential or a commercial space. A consumer of the plurality of consumers 118 may be engaged with multiple delivery platforms, such as the mobile delivery platform (such as a smartphone) and the linear delivery platform (such as a television or TV content streaming application in a d). For example, a podcast application in a smart phone may correspond to a mobile delivery platform. A media streaming application in a mobile phone may provide a linear media access or a non-linear media access (such as video-on-demand (VOD)). One or more promotional audio or graphic items may be inserted based on intent or engagement of a user of the application on a delivery device. Each delivery device of the plurality of devices 106 may be associated with at least one of a unique device ID and a platform ID. Additionally, user related data may be accessible on each delivery device of the plurality of devices 106.

Each of the plurality of devices 106 may comprise suitable logic, circuitry, and interfaces that may be configured to receive and/or render the advertisement content corresponding to each delivery platform. In one scenario, the advertisement content may be received for placement between or over at least one of a set of inventory items. The set of inventory items may correspond to a set of engageable items for the user. At least one of the set of inventory items may correspond to a media item, a web page, a document, an e-mail, or an application. Each inventory item may be associated with a preference of a target audience based on one or more preferences. Example of the preferences may include, but are not limited to, genre, field, content, and other parameters. For example, an inventory item, such as a television program, may be preferred based on content, theme, actors or location. Additionally, an inventory item may be associated with a rating, a review, a popularity index, a viewership, or number of shares or likes, which may be used to identify relevant ad slots and associated pricing and demand for the placement of the advertisement content. The media item may be a scheduled program on a television, a streamed video on a web channel, or a podcast or audio broadcast on a web or radio platform.

Advertisement content, for example, a media-based television advertisement may be placed between one or more ad slots that may be present between a television program or a picture-in-picture (PIP) type of placement. In another scenario, the advertisement content may be received by the plurality of devices 106 to notify a consumer (of the plurality of consumers 118), by visual or audible media, about the advertisement content. In one example, video ads, such as pre-roll ads, mid-roll, or post-roll ads, may be delivered on digital platforms. In another example, a consumer engaged in a music listening activity in a music application of a mobile device may hear a promotional sound clip during the engagement. Alternatively, the consumer may receive an ad notification, or a pop-up message based on context or time of targeting the advertisement content. The advertisement content comprises one or more promotional items, each of which may correspond to an advertisement for a product, service, cause or media content. The advertisement content may be present in one or more formats. The one or more formats of the advertisement content may be present to suitably target each of the plurality of delivery platforms 104. Examples of the one or more formats include, but are not limited to, a video format, an audio format, a text format, an image format, or a suitable programmable or non-programmable instructions format. For example, an application in a mobile device may be configured to generate and serve the advertisement content, as notifications or banners, snippets of information, or an video ad, based on programmable or non-programmable instructions. The advertisement content may be further classified as an interactive advertisement content or un-interactive advertisement content. The interactive advertisement content may correspond to an interactive media item such that each outcome (e.g., a click, an impression, page redirections, user views, or any outcome) may be recorded as part of an outcome stream for the corresponding consumer. Additionally, views or outcome may be recorded as impressions, and page redirections or commercial sale on a redirected page may be recorded in real time or near-real time.

The one or more client terminals 108 may comprise suitable logic, circuitry, and interfaces that may be configured to provide a communication interface to one or more clients for providing one or more requests to the cross-platform management system 102. The one or more requests may correspond to one or more client-defined requirements. The one or more client terminals 108 may further receive a proposal plan from the cross-platform management system 102 corresponding to each request. Each client terminal may be further configured to track progress and performance of the cross-platform management system 102 for each request. A client associated with at least one of the one or more client terminals 108 may be configured to visualize a real time progress and completion of the one or more client-defined requirements of the request. A client terminal may include a communication interface integrated within a standalone device (such as a kiosk, a networked mobile, or a computer) or a cloud server with a web or cloud-based application.

The ad server 110 may comprise suitable logic, circuitry, and interfaces that may be configured to maintain a repository of advertisement content. The advertisement content may correspond to one or more promotional items, such as media files, images, texts, logos or animations, in a specified platform-adapted format. The advertisement content may be associated with the one or more clients that may be an owner or an associated promoter of a brand, a service, a cause or a media item. The request for access to the advertisement content may be programmatically managed based on a generated proposal plan for corresponding request from the client. For example, the ad server 110 may comprise a graphic ad of a brand for digital delivery platforms and a video ad of a brand for linear delivery platform.

The media CDN 112 may comprise suitable logic, circuitry, and interfaces that may be configured to distribute media content over one or more distribution channels. Each distribution channel may correspond to a streaming network for distribution of the media content in formats and specifications adapted for the delivery platform. The media CDN 112 may be configured to provide media content via a distribution technology that may include broadcast, simulcast, multicast, such as via an over-the-air content delivery/distribution network, a linear content delivery/distribution network (such as VOD), a cable content delivery/distribution network, a satellite content delivery/distribution network, an Internet Protocol (IP) based content delivery/distribution network, and/or the like.

The audience data sources 114$a$, . . . , 114$n$ may comprise suitable logic, circuitry, and interfaces that may be configured to retrieve and store audience data that corresponds to a plurality of consumers 118 of at least one of a plurality of devices 106 on plurality of delivery platforms 104. The retrieval, storage, or any processing related to the audience data is executed in compliance with different governmental regulation and policies related to data privacy and protection applicable, if any, to a particular jurisdiction or a geographical area, and such collected audience data. The audience data may include, but is not limited to, demographics data, audience targeting data, device data, and geo-location data. The demographic data may correspond to a set of statistical data with classification of each user based on at least one of race, gender, ethnicity, age, and the like. Similarly, the audience targeting data may correspond to at least one of user preferences, user behavior, social status, income, spending trends, and the like. The device data may correspond to a device identifier (ID) and a platform ID of each delivery device which may be associated with one or more of the plurality of consumers 118. Additionally, the platform ID may be associated with one or more host applications on a delivery device, for example, a mobile delivery platform may be associated with e-mail clients, web browsers and linear or non-linear media streaming applications. Each host application may be associated with a user ID which may or may not be the same as the device ID, for example, an e-mail ID, a phone number, a cookie ID, image, digital signatures, fingerprints, or some alphanumeric or graphical IDs. For example, a user may be engaged with multiple delivery platforms, such as a mobile delivery platform (such as a smartphone) and a linear delivery platform (such as a television). The device ID for the mobile platform and the linear platform may correspond to an international mobile equipment identity (IMEI) number (or a phone number) and a set top box number (or a subscriber ID) respectively. Alternatively, a user (may or may not be registered) may be tracked on each of the plurality of delivery platforms 104 associated with the plurality of devices 106 based on one or more trackers. Examples of the trackers may include, but are not limited to, cookies, web beacons, e-mail trackers, bots and Internet protocol (IP) and network-based trackers. The audience data sources 114$a$, . . . , 114$n$ may further include user estimation data.

The user estimation data may include estimated values, such as user ratings, impressions, outcomes, review, and likes or dislikes for certain media items, derived from analysis of the audience data corresponding to the plurality of consumers 118 of the at least plurality of delivery platforms 104. The user estimation data may also include a path to retrieve a specific media item, for example, a trending media item. The cross-platform management system 102 using the audience data sources 114$a$, . . . , 114$n$ may further generate an audience forecast information and estimate audience for at least one of a target or demographics for a specific item. The specific item may correspond to a web-page, an e-mail, an application page, and the like. The audience forecast information may include audience rating estimates, lead-in audience estimates, and/or other research-based forecast. The cross-platform management system 102 using the audience data sources 114$a$, . . . , 114$n$ may also generate an expected audience of an advertisement content scheduled for a specific bin of time on a day. Additionally, the audience data sources 114$a$, . . . , 114$n$ may acquire historical viewership data of the specific item on at least one of the plurality of delivery platforms 104. For example, the audience data sources 114$a$, . . . , 114$n$ may acquire historical viewership of career related emails or a specific aired program on a specific television channel. The bin of time, location and frequency for the viewership may be acquired by the audience data sources 114$a$, . . . , 114$n$. A measure of purchase intent for historical advertisement content may also be recorded by the audience data sources 114$a$, . . . , 114$n$ for each type of demography, such as based on gender, age band, area, and income group.

In operation, the cross-platform management system 102 may be configured to receive, from a client, a request corresponding to the plurality of client-defined requirements, via at least one of the one or more client terminals 108 associated with a client. The request may pertain to a proposal plan to achieve the one or more client-defined requirements. Each of the one or more client-defined requirements may correspond to a defined goal which may be associated with a target budget value, a target reach, or target impressions. A client-defined requirement may correspond to a reach to maximum users of a specific income group, maximization of impressions from a specific number of users for a defined time duration, maximization of a revenue parameter, and minimization of a total penalty that may arise from deviations of goal values specified in the deals for advertisers and/or advertisement campaigns. Additionally, the request may be associated with one or more request parameters. The one or more request parameters may include, but are not limited to, a desired audience, a requested distribution of audience on the plurality of delivery platforms 104 (mix), a cost constraint defined by a budget and a flight and intermittent schedule of placement of the advertisement content. A flight may correspond to a desired time duration for delivery of the advertisement content (or running campaign) across the plurality of delivery platforms 104. The flight may be provided by the user or may be adjusted based negotiations with the client. The adjustment may be based on budget constraints or availability of required inventory or number of consumers to be reached. The target audience may correspond to a target plurality of consumers 118 on the plurality of delivery platforms 104 associated with platform IDs or device IDs. The platform IDs or device IDs associated with the target plurality of consumers 118 may be retrieved from the audience data sources 114a, . . . , 114n.

In certain scenarios, a particular goal (also referred to as a client-defined requirement) may be provided that is to be achieved for a campaign, for example, to reach out to a certain number of people for a certain time period irrespective of the platform selected for the campaign. In such scenarios, a single campaign may be created for the linear media delivery platform, and a total viewership may be tracked. In an event, the total viewership at a given time point (e.g. after "1 week") within the "2 weeks' time period" is less (under delivering) than an estimated value for such time point, other media delivery platforms, such as mobile, may be utilized to meet the provided goal. Alternatively, to achieve the goal, one campaign may be created for each selected media delivery platform, for example, the linear, the mobile, and the digital media delivery platforms with certain proportion of media mix. For example, "50%" target to be achieved by linear, "20%" by mobile, and remaining "30%" impressions to be achieved by digital media delivery platform. Such distribution of the goal, for example, may be done using the optimization framework to meet a plurality of defined request parameters, for example, multiple objectives, applied not only to one platform but cross-platforms.

In certain other scenarios, a particular goal, for example, a goal to achieve a certain number of impressions in a given period, may be provided. The particular goal may be associated with the one or more goal parameters, for example, a distribution of target audience on different delivery platforms or allocation of ad slots, which may be adjusted dynamically over time to obtain a maximum achievement of the goal.

In certain other scenarios, a goal of specified number of impressions may be provided to be mandatorily achieved via different media delivery platforms, for example, mobile media delivery platform, digital media delivery platform, and linear media delivery platform of the plurality of delivery platforms 104. In such scenarios, different campaigns may be required to be created for each desired media delivery platform. For this, the cross-platform management system 102 may be configured to generate a proposal plan corresponding to the request from the client. The proposal plan may comprise a proposed distribution of target audience on each requested delivery platform (i.e., a recommended mix, budget, and objectives of be achieved). The cross-platform management system 102 may generate an optimal proposal plan based on balanced fitment of the requested one or more parameters with one or more defined parameters for the proposal plan. An example of the creation of proposal plan, and periodic optimization, and re-optimization, is described for example, in FIGS. 3A, 3B, and 3C.

The cross-platform management system 102 may be configured to store data corresponding to promotional opportunities on the plurality of delivery platforms 104. The promotional opportunities may correspond to inventory-defined promotional opportunities, such as media content placement opportunities of different length, an available capacity across the plurality of delivery platforms 104 at the time of receipt of a client request, video ad slots, PIP slots, graphical or banner slots, associated with the set of inventories. Additionally, the promotional opportunities may correspond to user-defined promotional opportunities. For example, the cross-platform management system 102 may identify an actual number of engageable audience, active on the plurality of delivery platforms 104.

The cross-platform management system 102 may further execute the proposal plan by adaptively serving the advertisement content, via each planned delivery platform, between or over the at least one of the set of inventory items. The advertisement content may be obtained from the ad server 110 and the engagement items may be obtained from the media CDN 112 or from a self-maintained internal repository. The cross-platform management system 102 may adaptively control and monitor delivery of the advertisement content on each planned delivery platform for granular bins of time duration in accordance with the planned distribution of the target audience on each planned delivery platform, as discussed in detail in FIGS. 3B, 3C, 4 and 5. Thus, in other words, to achieve a common goal of the specified number of impressions, a media mix for cross-platform may be executed by the cross-platform management system 102 such that the plurality of defined request parameters are determined in an optimized manner in order to meet the given objective(s). An example of the different objectives is described, for example, in FIG. 3A.

Figure 2:
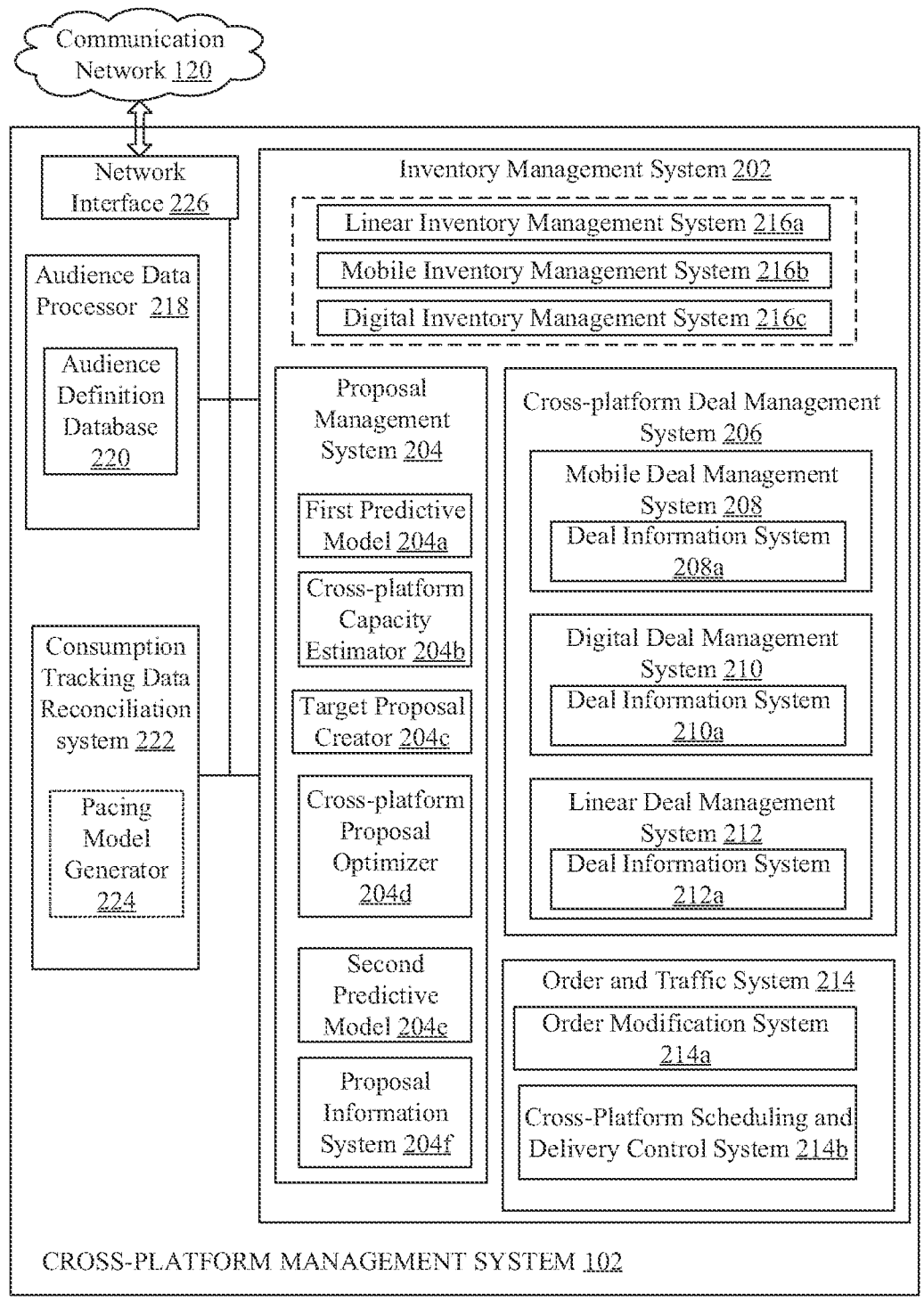
FIG. 2 is a block diagram that illustrates an exemplary cross-platform management system for cross-platform proposal and deal management, in accordance with an embodiment of the disclosure.

FIG. 2 is a block diagram that illustrates an exemplary cross-platform management system 102 for cross-platform proposal and deal management, in accordance with an embodiment of the disclosure. Referring to FIG. 2, there is shown the cross-platform management system 102 that further comprises an inventory management system 202. In some embodiments, the inventory management system 202 may include a proposal management system 204 and a cross-platform deal management system 206. The cross-platform deal management system 206 may further include a mobile deal management system 208, a digital deal management system 210, and a linear deal management system 212. The inventory management system 202 may further include an order and traffic system 214 and various inventory management systems (such as a linear inventory management system 216a, a mobile inventory management system 216b, and a digital inventory management system 216c) for different delivery platforms of the plurality of delivery platforms 104. In some embodiments, the proposal management system 204 may be separate system and may not be included within the inventory management system 202. In such embodiments, the information and instructions may be exchanged between the proposal management system 204 and the inventory management system 202.

The cross-platform management system 102 may further include an audience data processor 218 and a consumption tracking data reconciliation system 222. The audience data processor 218 may be configured to store the audience definition information in an audience definition database 220. The consumption tracking data reconciliation system 222 may include a pacing model generator 224. The audience definition database 220 and the consumption tracking data reconciliation system 222 may be operatively connected to the proposal management system 204. Additionally, one or more client terminals 108 (FIG. 1) may be operatively coupled to each of the inventory management system 202, the audience definition database 220, and the consumption tracking data reconciliation system 222. The operational connection of the one or more client terminals 108 may be enabled to provide an interface for one or more clients to communicate requests, provide inputs, and visualize performance corresponding to the requested requirements.

The inventory management system 202 may comprise suitable logic, circuitry, and interfaces that may be configured to monitor and track an available set of inventory items corresponding to one or more requests received from corresponding one or more clients. The set of inventory items may include, but are not limited to, a repository of media content (e.g., an advertisement media of different length, such as an "X" second video or audio), a number of ad slots in a broadcast feed for various buckets of time, and a repository of inventory items for different genres, age groups, sex, and other demographic factors. Additionally, the inventory management system 202 may keep track of an available bandwidth (with respect to traffic) in ad space in accordance with the request received from each of the one or more clients.

In accordance with an embodiment, the inventory management system 202 may be configured to manage and track requirements of the set of inventory items discretely for each delivery platform, such as linear, digital and mobile delivery platforms, of the plurality of delivery platforms 104. In other words, the inventory management system 202 may allocate the tasks of management and monitoring of requirements of the set of inventory items to the linear inventory management system 216a, the mobile inventory management system 216b, and the digital inventory management system 216c. The inventory management system 202 may also allocate the task of management and monitoring to other delivery platforms also, without a deviation from the scope of the disclosure. In accordance with another embodiment, the inventory management system 202 may be configured to manage and monitor the requirements of the set of inventory items holistically for each delivery platform, such as linear, digital and mobile delivery platforms, of the plurality of delivery platforms 104.

The linear inventory management system 216a may be configured to manage and monitor requirements of the set of inventory items for corresponding linear delivery platform of the plurality of delivery platforms 104. For example, the availability and demand of ad slots in specific television programs for a bucket of time may be managed by the linear inventory management system 216a. The linear inventory management system 216a may also store information, such as genre, length, ratings, reviews, viewership, and the like, related to the type of television program or content. The set of inventory items may be ranked, and each ad slot may be priced for each type of advertisement content based on determination of rank for each inventory item of the set of inventory items. For example, a first inventory item, such as an episode of a live chat show, may have viewership in millions and a second inventory item, such as a documentary on healthcare, may have viewership in thousands. Therefore, the demand for ad slots in the first inventory item may be greater than the demand for the second inventory item. Therefore, the linear inventory management system 216a may price the ad slots for the first inventory item at a greater price than the price for the ad slots in the second inventory item. The proposal management system 204 may generate a proposal plan based on optimal allocation of low priced slots and high-priced slots for each request for the proposal plan from each corresponding client.

The mobile inventory management system 216b may be configured to manage and monitor requirements of the set of inventory items for corresponding mobile delivery platform of the plurality of delivery platforms 104. The set of inventory items for the mobile delivery platform may comprise, but is not limited to, a number of promotional opportunities in a set of mobile web pages, mobile e-mail client and emails, mobile applications (mobile or web), mobile media streams, mobile messages, mobile podcasts, browsers, and the like. The availability and demand of promotional opportunities for the advertisement content in mobile-specific inventory items for a bucket of time may be tracked and managed by the mobile inventory management system 216b. The mobile inventory management system 216b may also store information related to the type of inventory item for the mobile delivery platform, such as context, presentation quality, ratings, reviews, historical viewership, application interface, and the like.

The digital inventory management system 216c may be configured to manage and monitor requirements of the set of inventory items for corresponding digital delivery platform of the plurality of delivery platforms 104. The set of inventory items for the digital delivery platform may include but is not limited to a number of ad slots in a set of web pages, e-mails, applications (mobile or web), messages, podcasts, and the like. An availability and demand of promotional opportunities, such as ad slots, for the advertisement content in specific inventory items for a bucket of time may be tracked and managed by the digital inventory management system 216c. The digital inventory management system 216c may also store videos, text information, and attributes, for example, context, presentation quality, ratings, reviews, historical viewership, and the like, related to the type of inventory item for the digital delivery platform. In some embodiments, the digital inventory management system 216c may be configured to display video and text, for example, pre-roll ads, mid-roll ads, and post-roll ads.

In accordance with an embodiment, the linear inventory management system 216a may correspond to an engine for managing and tracking resources and inventories for television, marketing and/or advertisement plans. The digital inventory management system 216c may correspond to an engine for management and tracking of resources and inventories for digital marketing plans. The mobile inventory management system 216b may correspond to an engine for management and tracking of mobile advertisement marketing plans.

The proposal management system 204 may comprise suitable logic, circuitry, and interfaces that may be configured to receive a request corresponding to one or more client-defined requirements from a client and generate a proposal plan corresponding to the request received from the client. The request may correspond to one or more objectives, which may be achieved in a defined time duration, known as a flight. For example, the proposal management system 204 may receive a request to obtain one million impressions for a specific advertisement product in ten days. The request may be further associated with the one or more request parameters, such as a budget of "100,000 USD", a target audience of "teens in an age range of 14-19", a preferred location of "Los Angeles", and a requested exemplary distribution of about "50%", about "30%", and about "20%" of target audience on the plurality of delivery platforms 104. The request may further be associated with at least one of a constraint on cost, for example, cost per thousand impressions (CPM), association of the advertisement content of the client with specific brands, content provider or channel, time or day of targeting constraint, and the like. The proposal management system 204 may further validate the one or more client-defined requirements and generate the proposal plan. The generated proposal plan may comprise at least a proposed distribution of target audience across the plurality of delivery platforms 104. Additionally, the generated proposal plan may be an aggregate of one or more proposal plans corresponding to one or more requests from a client.

The proposal management system 204 may include a first predictive model 204a. The first predictive model 204a may comprise suitable logic, circuitry, and interfaces that may be configured to receive, for example, an initiate signal from the proposal management system 204. Based on the received initiate signal, the first predictive model 204a may be configured to predict a count of users across a set of delivery platforms of the plurality of delivery platforms 104 over a flight. The count of users may also be referred to as a reach or a count of reachable users. The count of users across the set of delivery platforms, may be predicted based on the determined audience definition information in the audience definition database 220. The set of delivery platforms are delivery platforms that are selected in accordance to a mix of different delivery platforms requested in the plurality of client-defined requirements in client request.

The proposal management system 204 may include a cross-platform capacity estimator 204b. The cross-platform capacity estimator 204b may comprise suitable logic, circuitry, and interfaces that may be configured to determine an available capacity across the plurality of delivery platforms 104 at receipt of a client request. The determined audience definition information, inventory information from each of the linear inventory management system 216a, the mobile inventory management system 216b, and the digital inventory management system 216c, and the predicted count of users across the selected set of delivery platforms of the plurality of delivery platforms 104 over the flight, provides a good notion of the available capacity. The inventory information indicates current booked inventory items or promotional opportunities for each individual delivery platform of the plurality of delivery platforms 104.

The proposal management system 204 may further include a target proposal creator 204c. The target proposal creator 204c may comprise suitable logic, circuitry, and interfaces that may be configured to initially create an interim proposal plan corresponding to the received request based on one or more request parameters. The interim proposal plan corresponds to at least a distribution of target audience across the set of delivery platforms of the plurality of delivery platforms 104. The created interim proposal plan may be optimized based on adjustment of the one or more request parameters with respect to a set of proposal parameters by a cross-platform proposal optimizer 204d of the proposal management system 204.

The cross-platform proposal optimizer 204d may comprise suitable logic, circuitry, and interfaces that may be configured to optimize the created interim proposal plan to generate a proposal plan that can be communicated to a client for acceptance before execution, via the one or more client terminals 108. The cross-platform proposal optimizer 204d may further control execution of the generated proposal plan and continuously optimize and re-optimize the generated proposal plan in accordance with optimal distribution of promotional opportunities with identified set of inventory items for granular buckets of time duration. The optimal distribution of promotional opportunities, such as ad slots, may correspond to a balance of the one or more client-defined requirements and availability of promotional opportunities or validity of the one or more request parameters. For example, the generated proposal plan for a client may guarantee a reach of the advertisement content to "30%" users on mobile delivery platform and "40%" users on linear delivery platform in "3 days". The value of "30%" users on the mobile delivery platform and "40%" users on the linear delivery platform may be under-achieved during the first day due to a shortage of promotional opportunities. The cross-platform proposal optimizer 204d may identify such deviations and modify (or dynamically adjust) the distribution such that the client-defined requirement of "30%" users on mobile delivery platform and "40%" may be achieved in the "3 day" time duration. The cross-platform proposal optimizer 204d may be further configured to moderate the distribution of the target audience on plurality of delivery platforms 104 during a flight of the proposal plan to optimally balance factors affecting the one or more client-defined requirements.

The proposal management system 204 may further include a proposal information system 204f which may be configured to collect, store and process statistical and non-statistical data for each request from each corresponding client to identify a correlation and availability of resources for the request of the client. For example, a client may provide a request to obtain "100,000" impressions for a certain beauty product in a "2 days duration" at a CPM of "10 USD" and cost per sale (CPS) of "25 USD". Here, CPS may be considered as an example of cost per outcome. In this example, the request may further comprise an exemplary distribution of target audience by "40%", "20%", and "40%" on a linear, a digital, and a mobile delivery platform respectively, each user being a female in an age range of "18-40 years". The proposal information system 204f, in conjunction with the cross-platform management system 102, may determine that the budget of the client for the requested proposal plan may not be achieved in the "2-days" duration. Therefore, the proposal management system 204, in conjunction with the proposal information system 204f, may determine one or more points of negotiation in the request and based on acceptance, a negotiated proposal plan may be generated. It may be noted that in the above example, the proposal management system 204 receives one request from a client. However, those skilled in the art would appreciate that the proposal management system 204 may receive more than one request, concurrently or serially, from more than one client.

The cross-platform deal management system 206 may comprise suitable logic, circuitry, and interfaces that may be configured to execute the generated proposal plan in the defined time duration on at least one of the plurality of delivery platforms 104 in accordance with the one or more client-defined requirements corresponding to the received request. In accordance with an embodiment, the cross-platform deal management system 206 may further comprise platform-defined deal management systems, such as a mobile deal management system 208, a digital deal management system 210, and a linear deal management system 212. Each platform-defined deal management system may be configured to discretely execute the proposal plan on corresponding delivery platform of the plurality of delivery platforms 104 based on corresponding allocated distribution of target audience. The set of constraints, budget, and availability of the inventories may be segregated and classified for each delivery platform of the plurality of delivery platforms 104 and managed independently by the each of the one or more platform-defined deal management systems. Additionally, each platform-defined deal management system may further comprise a deal information system, such as deal information systems 208a, 210a, and 212a. The cross-platform deal management system 206 may retrieve deal related information from each of the deal information systems 208a, 210a, and 212a and may store, update and moderate the set of proposal parameters, the one or more request parameters and inventory information in real time or near-real time.

The order and traffic system 214 may comprise suitable logic, hardware, and interfaces to manage one or more orders in the generated proposal. The order and traffic system 214 may be configured to clear orders based on available inventory. The orders may be cleared, for example, on a first come first serve (FCFS) basis. When an order is received, the order may specify the certain inventory units be placed in promotional slots or opportunities for different time periods in a flight. Since there may be multiple bookings occurring, the order and traffic system 214 ensures the availability of the inventory for booking the required inventory units for the order. The order modification system 214a of the order and traffic system 214 may be configured to change the attributes associated with an order that has already cleared inventory, add one or more inventory units for an order to the inventory, or delete one or more inventory units from inventory. The inventory units correspond to promotional slots, e.g., ad slots, and promotional opportunities where the advertisement content can be inserted for consumption. The order and traffic system 214 may be further configured to receive cleared and/or modified orders and queue them for assignment to an available promotional slots or spots and further pass such information to the cross-platform scheduling and delivery control system 214b for scheduling and delivery.

The cross-platform scheduling and delivery control system 214b may comprise suitable logic, circuitry, and interfaces that may be configured to generate a schedule based on the generated promotion plan and received cleared and/or modified orders. The cross-platform scheduling and delivery control system 214b may be further configured to monitor the generated schedule and delivery of the advertisement content on each delivery platform in the generated proposal plan corresponding to received request from the corresponding client. The schedule and the delivery of the advertisement content may be monitored to identify deviations in achievement of the generated proposal plan from the requested proposal plan. Additionally, one or more results corresponding to the one or more client-defined requirements may be obtained. The obtained one or more results may be shared with the cross-platform deal management system 206 and the inventory management system 202. For example, a promotional banner may be placed in content, on web pages and e-mails, a promotional video may be placed in ad placements in television media streams and a graphic or animation may be placed in ad placements in mobile applications during a first day of scheduled delivery of the advertisement content. A set of impressions received on the promotional banner in webpages, e-mails and mobile applications may be recorded and a quarter of a million reach via the linear, digital and mobile delivery platforms may be recorded during the first day. The data may be transmitted, via the communication network 120, to the cross-platform scheduling and delivery control system 214b and further transmitted to the cross-platform deal management system 206 and the inventory management system 202.

The audience data processor 218 may be configured to process audience data received from the audience data sources 114a, . . . , 114n, by a network interface 226, through the communication network 120. The audience data processor 218 may be configured to determine an audience definition information that is consistent across the plurality of delivery platforms 104 based on audience data of each individual delivery platform of the plurality of delivery platforms 104 received from a plurality of different audience data sources, such as the audience data sources 114a, . . . , 114n, via the network interface 226. The audience data processor 218 may be configured to store the audience definition information in an audience definition database 220. The audience definition database 220 may comprise suitable logic, circuitry, and interfaces that may be configured to store audience data that corresponds to the plurality of consumers 118 of at least one of the plurality of devices 106.

The consumption tracking data reconciliation system 222 may comprise suitable logic, circuitry, and interfaces that may be configured to reconcile consumption data for the advertisement content delivered at different delivery platforms across the set of delivery platforms. The consumption data may be received from a plurality of different service providers, such as the service providers 116a, . . . , 116n, at different time of day, at different frequency, and with different data structure for each time period during a flight. The reconciled consumption data is utilized to obtain the one or more results corresponding to the execution of the generated proposal plan with respect to the one or more client-defined requirements of the plurality of client-defined requirements. The consumption tracking data reconciliation system 222 may include a pacing model generator 224 that may be configured to generate a pacing model that indicates a difference in achieved consumption of advertisement content against a planned delivery of the advertisement content during execution of the generated proposal plan for the first time period, and subsequent time periods during the flight to be achieved, based on the measured deviation in the derived one or more results across the set of delivery platforms of the plurality of delivery platforms 104.

In operation, a client may provide a request for a proposal plan corresponding to the plurality of client-defined requirements, via a client terminal of the one or more client terminals 108, to the proposal management system 204. The client may correspond to a user (e.g., a brand promoter, an advertiser, a user in general, or programmable instructions which may provide a request associated with the plurality client-defined requirements, such as a reach of a brand, a cause, a service, or a campaign to a target audience or a specific number of impressions from the target audience. The proposal management system 204 may be configured to receive the request corresponding to one or more client-defined requirements to be achieved in a given flight. The request for the corresponding one or more client-defined requirements may be associated with one or more request parameters. A client-defined requirement, for example, may correspond to a reach to maximum users of a specific income group, maximization of impressions from a specific number of users in a defined time duration, maximization of a revenue parameter, and minimization of a total penalty that may arise from deviations of goal values specified in the deals for advertisers and/or advertisement campaigns. The one or more request parameters may include, but are not limited to, a desired audience, a distribution of audience on a plurality of delivery platforms 104 (mix), a cost constraint defined by a budget, and a flight or intermittent schedule of placement of the advertisement content.

In a first example, a client (A) may provide a request ($R_1$) for a client-defined requirement of "1 million" impressions for a health product (X) in a "10 day" duration. The one or more request parameters of the request may include, for example, a budget of "100,000 USD" (CPM of 10 USD), a distribution (mix) of target audience as "60%" on a mobile delivery platform and "40%" on a linear delivery platform, a geographical location of "California" (Over the Top (OTT)) and a time duration of targeting to be in a range of "7-10 PM". The target audience may be specified by an age group of "8-30 years", preferentially a male, within a specific income group of "60,000 USD" to "1M USD". The placement of the advertisement content across the set of inventory items may be constrained with the one or more constraints, such as a constraint on non-association with sexually explicit content and a competitive brand (Y).

In a second example, another client (B) may provide another request ($R_2$) for a client-defined requirement of a maximum reach of a campaign for a social cause (S) in a "15 day" duration. The one or more request parameters of the request may include a budget of "500,000 USD" (CPM of 8 USD), a distribution (mix) of target audience as "30%" on a mobile delivery platform, "50%" on a linear delivery platform, "20%" on a digital delivery platform, a geographical location of "Texas" and a time duration of targeting to be in a range of "5-9 AM". The target audience may be specified by an age group of "14-60 years", without any gender preference. The placement of the advertisement content across the set of inventory items may be constrained with the one or more constraints, such as a constraint on non-association with a meat associated brand.

In a third example, another client (C) may provide another request (R3) for a client-defined requirement of a sales parameter and value of "300,000 and 3 million USD" for a service (Z) in a "30 day" duration. The one or more request parameters of the request may include a budget of "300,000 USD" (CPM of "5 USD" and CPS of "10 USD"), a distribution (mix) of target audience as "40%" on a mobile delivery platform, "40%" on a linear delivery platform, and "20%" on a digital delivery platform, geographical location(s) with an average gross domestic product (GDP) of more than "200 billion USD" and a preferred time duration of targeting in a range of "8-11 PM". The target audience may be specified by an age group of "18-60 years", without any gender preference and preferentially a student or a working professional. The placement of the advertisement content across the set of inventory items may be constrained with the one or more constraints, such as a constraint on non-association with content for kids. The proposal management system 204 may be configured to perform an adjustment check for each client-defined parameter to determine an optimally adjusted client-defined parameter.

The proposal management system 204 implicitly examines all possible combinations of allocations across all feasible inventory items across all platforms (e.g., delivery platforms) required by the client and determines which allocations provides the best goal while at the same time meeting all constraints, such as availability of target audience, availability of inventory items or capacity requirement of the set of proposal parameters, budget and pricing constraints.

The availability of target audience as defined by the one or more request parameters may correspond to an available number of promotional opportunities on the requested delivery platform, or the availability of the inventory items, such media content or web pages, on the requested delivery platform. The target audience may be determined in conjunction with the audience data processor 218. The audience definition database 220 may be operatively coupled to the proposal management system 204. The audience definition database 220 be configured to store and provide records of each user and user-associated devices, a personal data, historical product, brand or service preferences, visited or present location(s), and historical interaction or viewing preferences. For each user, the audience definition database 220 may further include web cookies data, Nielsen watermark data, login or registration data, subscription data, IP address, network bandwidth data and the like. The audience definition database 220 may include platform or device ID for each delivery device associated with the plurality of delivery platforms 104. Examples of such platform or device IDs may include, but are not limited to, a web cookie, a web beacon, a contact number, an IMEI number, a media access control (MAC) address, an IP address, a set top box ID.

In accordance with an embodiment, audience data of each individual delivery platform of the plurality of delivery platforms 104 may be separately received from a plurality of different audience data sources, such as the audience data sources 114a, . . . , 114n, via the network interface 226. Such received audience data may not be uniform and compatible with each other. Thus, it may be difficult to utilize such audience data as such for planning and proposal creation and using such data may result in error. The audience data processor 218 may be configured to determine an audience definition information that is consistent across the plurality of delivery platforms 104 based on the audience data of each individual delivery platform of the plurality of delivery platforms 104 received from the plurality of different audience data sources, such as the audience data sources 114a, . . . , 114n. The audience data processor 218 may be configured to store the audience definition information in the audience definition database 220.

The total audience across all delivery platforms is a summation of users across all such platforms. The formula can be written as:

$$TA = \sum_{i,j} x_{i,j} \qquad (1)$$

where $x_{ij}$ is 1 if user $i$ uses delivery platform $j$, otherwise is 0

The target audience may be further selected based on constraints or requirements defined in the one or more request parameters of the request. The proposal management system 204 may take into account whether the required distribution of the target audience is available in the audience definition database 220 to achieve at least one of the plurality of client-defined requirements. The availability may depend on some pre-reserved slots for other client proposal plans or may depend on a lower budget quote in the request which may not satisfy the required volume of the target audience. The proposal management system 204 may perform adjustment of the distribution of the target audience on each requested delivery platform.

The availability for a set of inventory items or capacity requirement of the set of proposal parameters may be performed with respect to an inventory or brand associated with a request parameter. The cross-platform management system 102 works in conjunction with the inventory management system 202 to provide availability of the inventory items or capacity requirement. The inventory management system 202 may be configured to provide an availability of the set of inventory items and promotional opportunities (slots). Further, the cross-platform management system 102 may work in conjunction with third party inventory providers, or an associated media CDN 112. For example, a request may require placement of "20%" of promotional ads between ad slots of a specific television show on a linear delivery platform. The proposal management system 204 may transmit the constraint to the inventory management system 202. The inventory management system 202 may provide a list of unavailable slots for each scheduled day of airing the program to the proposal management system 204. The proposal management system 204 may be configured to adjust the inventory or brand associated request parameter with a feasible and adjusted distribution, such as "10%", on the linear delivery platform.

All other client's constraints are assessed for viability during the proposal creation. In one such instance, a price constraint (as defined by the budget) may violate a calculated minimum price constraint for the delivery of the promotional content on the plurality of delivery platforms 104 for the corresponding one or more client requirements. Referring to the first example, the cost per thousand (CPM) price of "10 USD" may violate a minimum price requirement for completion of the client-defined requirement of "1 million" impressions for the health product in the "10 day" duration. In another such instance, a constraint for association of the promotional content with specific brands or inventory items may be checked. Referring to the second example, the constraint on non-association with a meat associated brand may not be validated as the inventory management system 202 may identify "zero" available ad slots with non-meat associations for the placement of the promotional content in the time duration of "5-9 AM". The proposal management system 204 may be configured to adjust and verify the validity of the one or more constraints.

The generated proposal plan may be transmitted to the client, via the client terminal, for acceptance before execution and delivery of the advertisement content on the plurality of delivery platforms 104. After acceptance, the generated proposal plan may be transmitted to the cross-platform deal management system 206. The cross-platform deal management system 206 may be configured to execute the generated proposal plan during the flight on at least one of the plurality of delivery platforms 104 in accordance with one or more client-defined requirements. The execution of the proposal plan on the at least one of the plurality of delivery platforms 104 may correspond to management and delivery of the advertisement content to the target audience for each corresponding request from the client. Additionally, the execution of the proposal plan may correspond to a real time tracking of the set of proposal parameters, the distribution of target audience on different delivery platforms, and results corresponding to the one or more client requirements, such as impressions or a reach, during the flight of the execution. In other words, the cross-platform management system 102 may be configured to manage delivery and pace of achieving the one or more client-defined requirements in the requested proposal plan. For example, a proposal plan with an exemplary distribution of target audience by "20%", "30%", and "50%" on mobile, digital and linear delivery platform respectively, for a product (A) may be executed by the cross-platform deal management system 206. The proposal plan may be scheduled for a flight of "10 days", with a budget of "100,000 USD", and a constraint of placement of the advertisement content on technology related inventory items. The cross-platform deal management system 206 may be configured to book slots (promotional slots) and schedule placement of the advertisement content for the product (A) on each requested delivery platform based on an optimally determined distribution of the target audience for the one or more delivery platform for the given flight of the proposal plan and an availability of the inventory items satisfying the specified constraints and the budget line.

Figure 5:
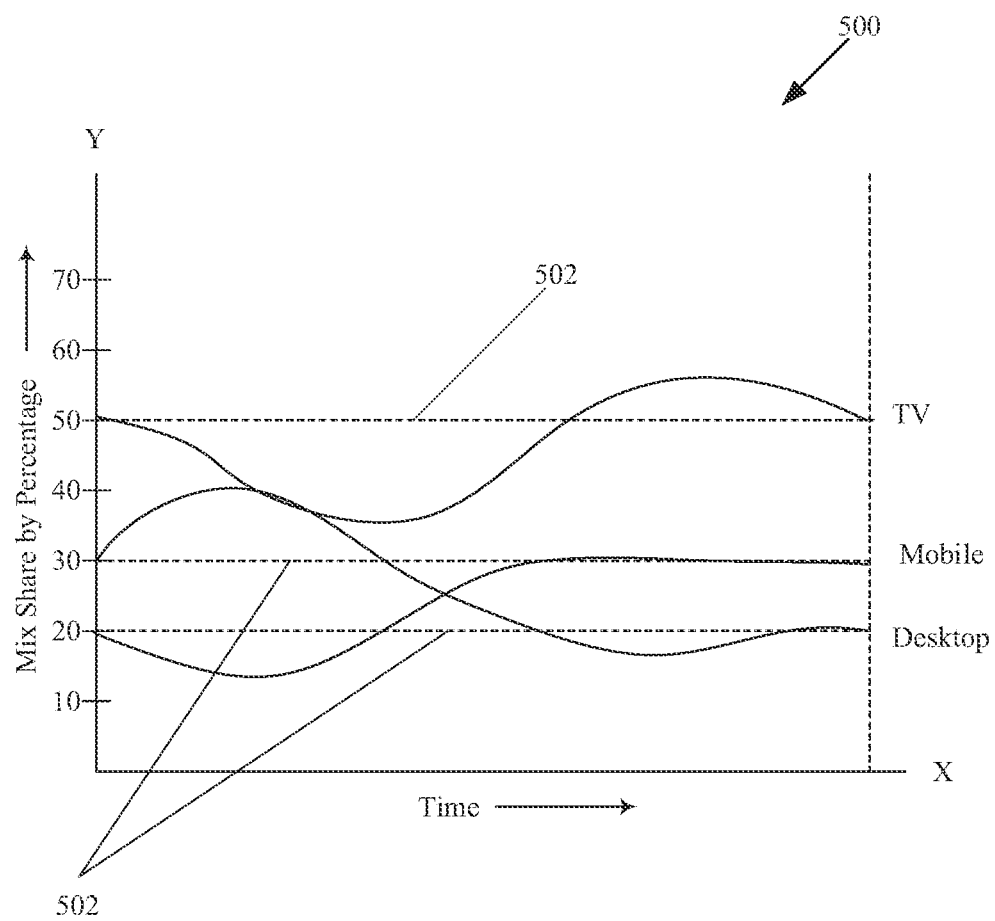
FIG. 5 is a graph that illustrates a time variant in-flight distribution of target audience across a selected set of delivery platforms, in accordance with an embodiment of the disclosure.
Figure 6A:
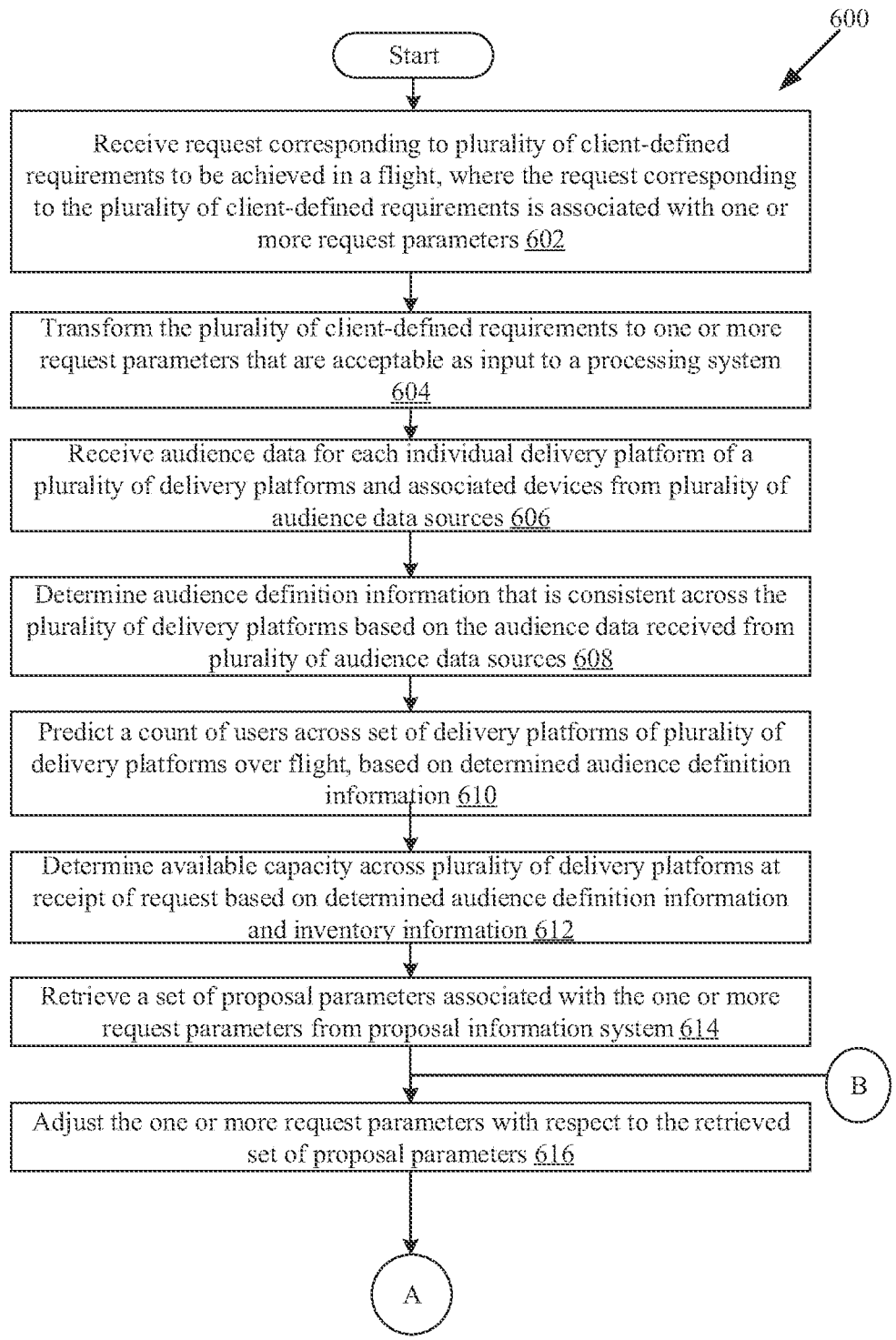
FIGS. 6A, 6B, 6C, and 6D collectively, is a flow chart that illustrates exemplary operations for cross-platform proposal and deal management, in accordance with an embodiment of the disclosure.
Figure 6B:
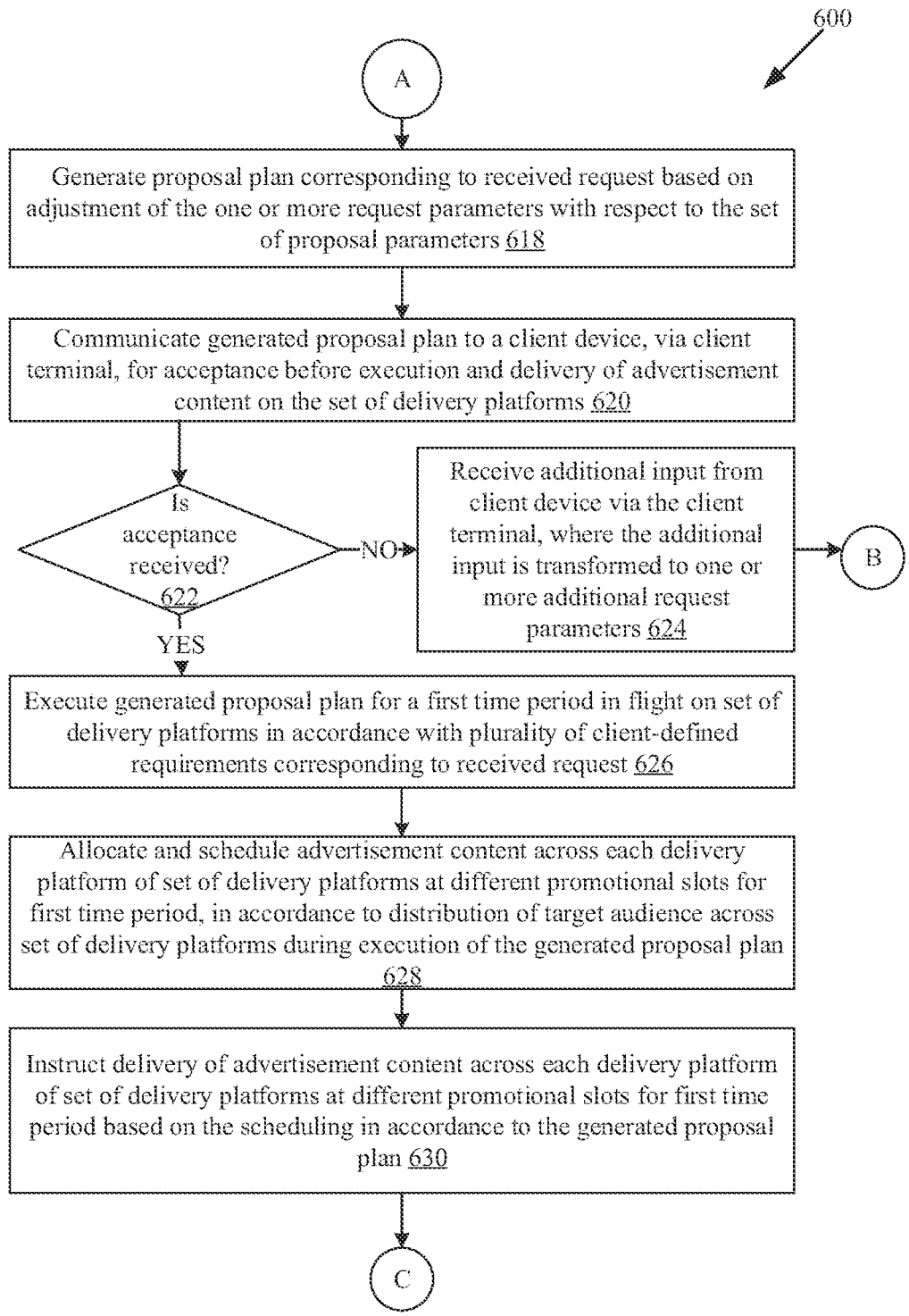
Figure 6C:
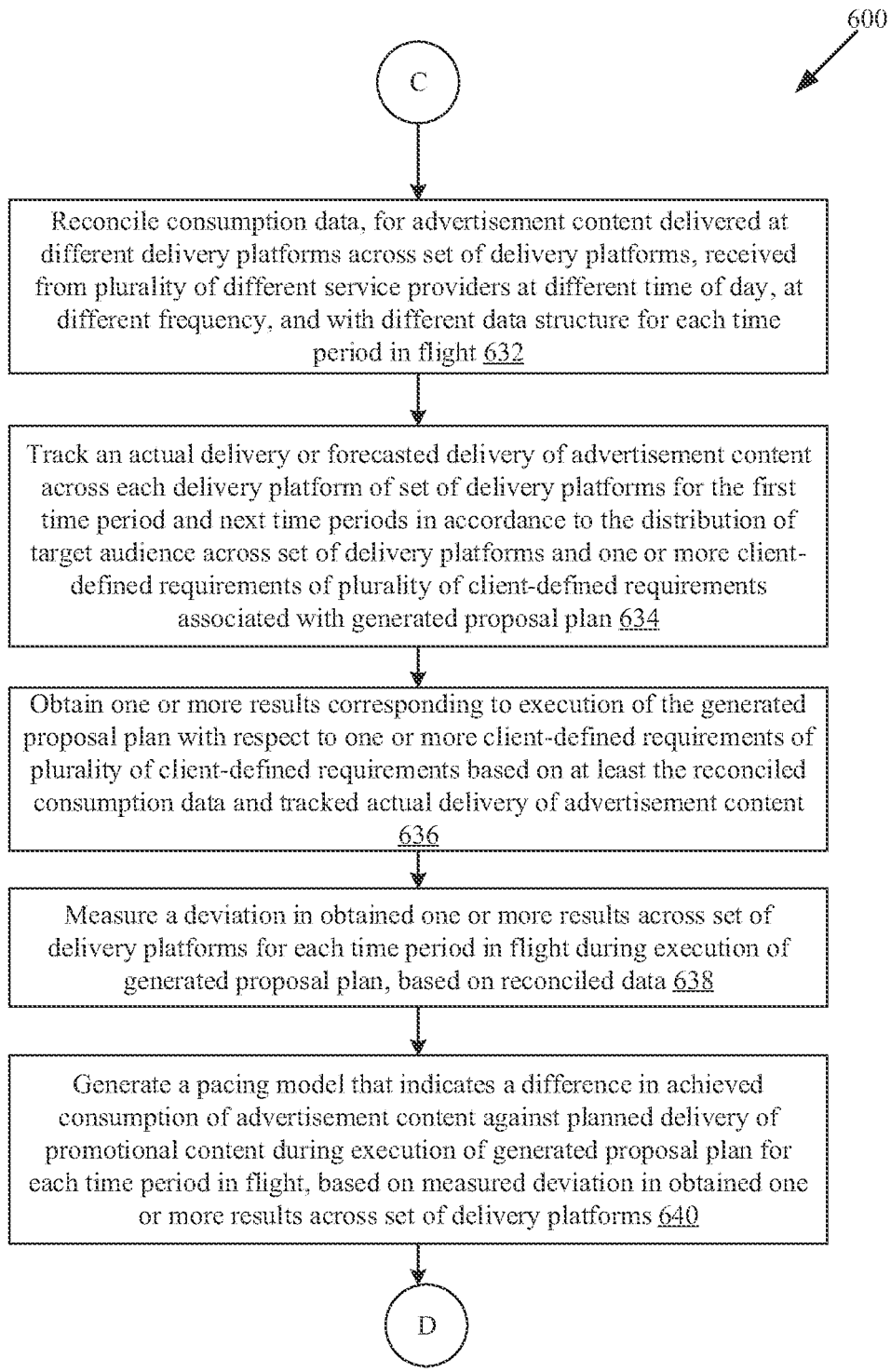
Figure 6D:
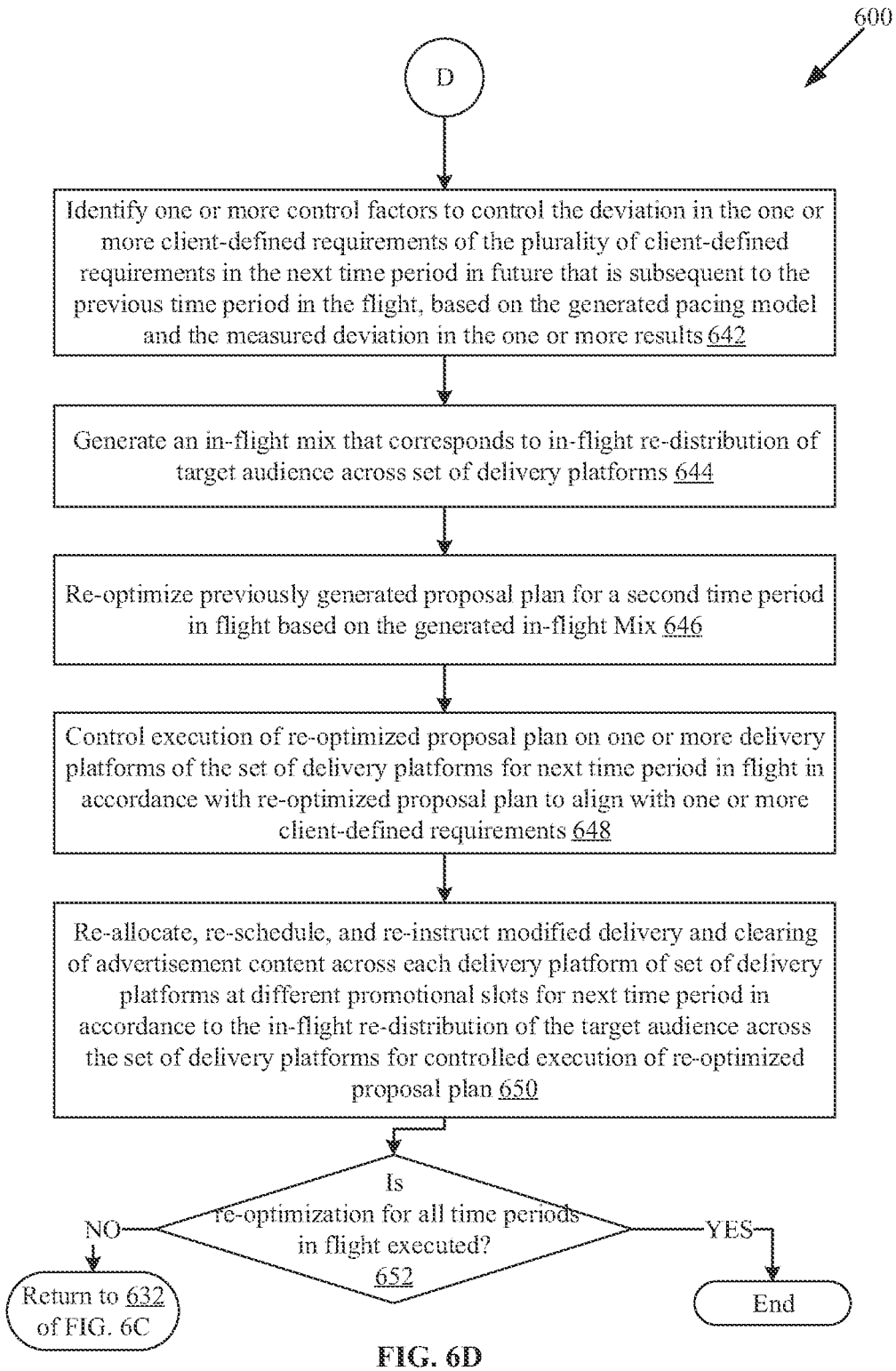

Referring to the third example, the generated proposal plan may comprise an adjusted distribution (mix) of target audience, for example, as "43%" on the mobile delivery platform, "37%" on the linear delivery platform, and "20%" on the digital delivery platform. The proposal management system 204 may execute the proposal plan with generation of schedules and slots in associated with a flight of the proposal plan in the "30 day" duration. The cross-platform deal management system 206 may be further configured to control (or dynamically modify and re-optimize) the distribution of the target audience for the one or more delivery platform for the given flight of the proposal plan for each granular bin of time, as illustrated in FIGS. 4 and 5.

In accordance with an embodiment, the execution of the generated proposal plan may deviate from achieving the plurality of client requirements with discrete bins of time during the flight of the proposal plan. The deviation may be present for granular bins of time and may be based on dynamic variations in consumption of promotional opportunities associated with the set of inventory items. Additionally, the deviation may be based on other similar factors apart from the ones mentioned above, without deviation from the scope of the disclosure.

The dynamics and the deviation in the proposal plan with respect to the flight of the proposal plan may be optimally balanced and controlled in real time by the cross-platform proposal optimizer 204d. The cross-platform proposal optimizer 204d may be configured to control execution of the generated proposal plan based on real time analysis of one or more control factors. The execution of the generated proposal plan may be controlled to optimally balance requirements of other concurrently operational proposal plans of other clients and pace of the generated proposal plan. Additionally, the control may be exercised upon the execution of the generated proposal plan based on real time analysis of one or more control factors. The one or more control factors may include, but are not limited to, a real time variation in demand of promotional opportunities, an under-delivery or over-delivery on a client requirement, and a deviation in the proposed reach or impression and the requested reach or impression. In accordance with an embodiment, the cross-platform proposal optimizer 204d may modify the distribution of the target audience on the plurality of delivery platforms 104 during the flight of the proposal plan in real time to optimally balance real time variations or deviations from the client-defined requirements in the proposal plan. In accordance with another embodiment, the cross-platform proposal optimizer 204d may modify the set of proposal parameters affecting the results from the execution of the proposal plan during the flight of execution.

In accordance with an embodiment, the cross-platform proposal optimizer 204d may perform context and/or sentiment mining of the advertisement content and the media content that may be aired in future. A correlation or mapping of the context and/or sentiment may be performed between at least one segment of the media content and the advertisement content. The allocation of the content or sentiment correlated advertisement content may be allocated at the one or more promotional opportunities (such as slots) within the context or sentiment correlated media content. The cross-platform proposal optimizer 204d, in conjunction with the media CDN 112, may be configured to optimally deliver the context or sentiment correlated advertisement content in the media content that is streamed across the plurality of delivery platforms 104. The optimal delivery of the context or sentiment correlated advertisement content may be performed to achieve the one or more client-defined requirements, such as the planned distribution of target audience across the plurality of delivery platforms 104, in the proposal plan. In other words, the context or sentiment correlated advertisement content may be placed at a time that may match with the scheduled or requested delivery of contextually or sentimentally relevant media content. The delivery of contextually or sentimentally relevant advertisement content along with the media content may affect intent (or interest) of target audience to react (or interact) with the advertisement content and therefore, such reactions from the target audience may be assessed to achieve the one or more client-defined requirements of the proposal plan. The proposal plan may be stewarded based on evaluation of a number of users that watch the contextually or sentimentally correlated advertisement content within the media content. In accordance with an embodiment, such evaluated number of users may be separate from the target audience or a demo measurement service.

The biggest challenge in the media industry when attempting to build a cross platform system is converting the value of an impression from TV to digital to mobile. The rates between the various delivery platforms are typically negotiated independently with the client as part of the campaign sales process and then delivered within separate operational tools and measured separately. However, the disclosed system, such as the cross-platform management system 102, can place a campaign based on content/sentiment relationship between the ad creative (the advertisement video to be aired) and programming by finding the matching content/sentiment within the future programming aired on any of the distribution platforms. In this case, the goal of the campaign is reached by content matching, which is done in the context of optimally reaching the audience when context is most relevant. The deal can be steward by simply counting any person watching that commercial within the programming divorced from audience or demo measurement services.

In general, the cross-platform proposal optimizer 204d may balance the requirements of the client based on adjustments in the distribution of the target audience across the plurality of delivery platforms 104 with dynamic variations in capacity (such as promotional opportunities) and inventory items. The operations of the cross-platform deal management system 206 and the inventory management system 202 may be controlled by the cross-platform proposal optimizer 204d.

With real time variations in at least one of the demand of promotional opportunities, the under-delivery or over-delivery on a client requirement, the undesirable results from applied distribution of target audience on the plurality of delivery platforms 104 for the flight of the proposal plan, and deviations in the proposed reach or impressions, the cross-platform proposal optimizer 204d may be configured to optimally modify the distribution of target audience on the at least plurality of delivery platforms 104 such that the real time variations may be favorably compensated and balanced. The modifications may be performed for granular bins of time duration such that each of the one or more client requirements may be completed during the flight of the proposal plan.

Referring to the first example, the cross-platform deal management system 206 may report under-delivery with a lower distribution (mix) of target audience as "40%" on the mobile delivery platform and "30%" on the linear delivery platform at the "$5^{th}$ day" due to unavailability of promotional opportunities (such as ad slots), 30% desktop computers or handheld. The cross-platform proposal optimizer 204d may re-optimize the generated proposal plan and accordingly modify the current distribution with a distribution (mix) of target audience as "50%" on the mobile delivery platform and "50%" on the linear delivery platform at the "$6^{th}$ day" to balance the under-delivery on the client-defined requirement of "1 million" impressions for the health product (X) in the "10 day" duration.

The control and execution of the proposal plan may be further managed and operationally delivered, in conjunction with the cross-platform deal management system 206 and the inventory management system 202, by the cross-platform scheduling and delivery control system 214b. The cross-platform scheduling and delivery control system 214b may be configured to monitor the generated schedule and delivery of the advertisement content on each delivery platform in the generated proposal plan corresponding to received request from the corresponding client. The schedule and the delivery of the advertisement content may be monitored to identify deviations in achievement of the generated proposal plan from the requested objectives. Additionally, the cross-platform scheduling system may be configured to obtain one or more results corresponding to the one or more client-defined requirements associated with the generated proposal plan. The obtained one or more results may be shared with the cross-platform deal management system 206 and the inventory management system 202. The shared one or more results may be assessed by the cross-platform proposal optimizer 204d to assess deviations in meeting the client-defined requirements of the proposal plan.

Figure 3A:
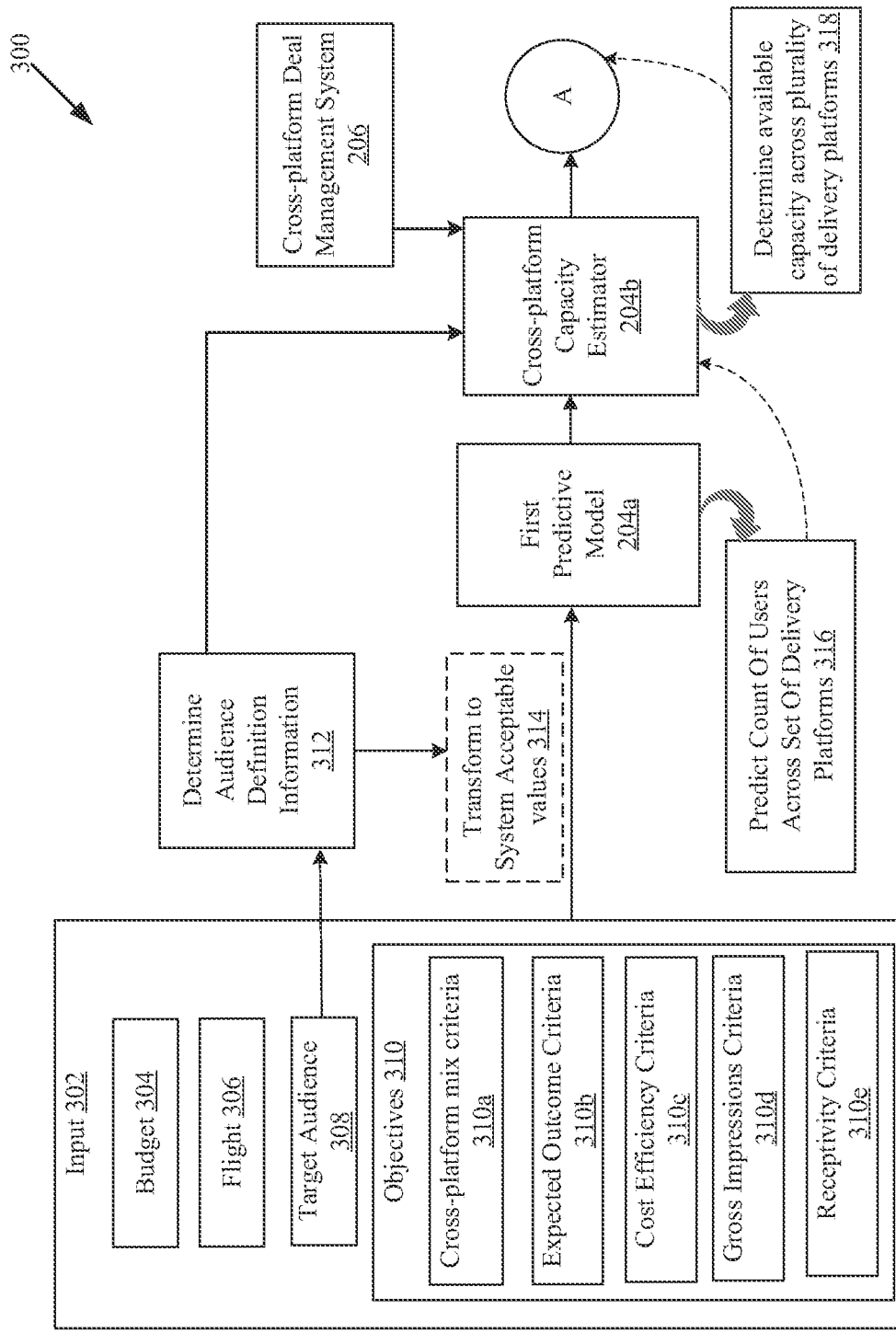
FIGS. 3A, 3B, and 3C illustrates an exemplary processing pipeline for cross-platform proposal creation, optimization, and re-optimization during a flight, in accordance with an embodiment of the disclosure.
Figure 3B:
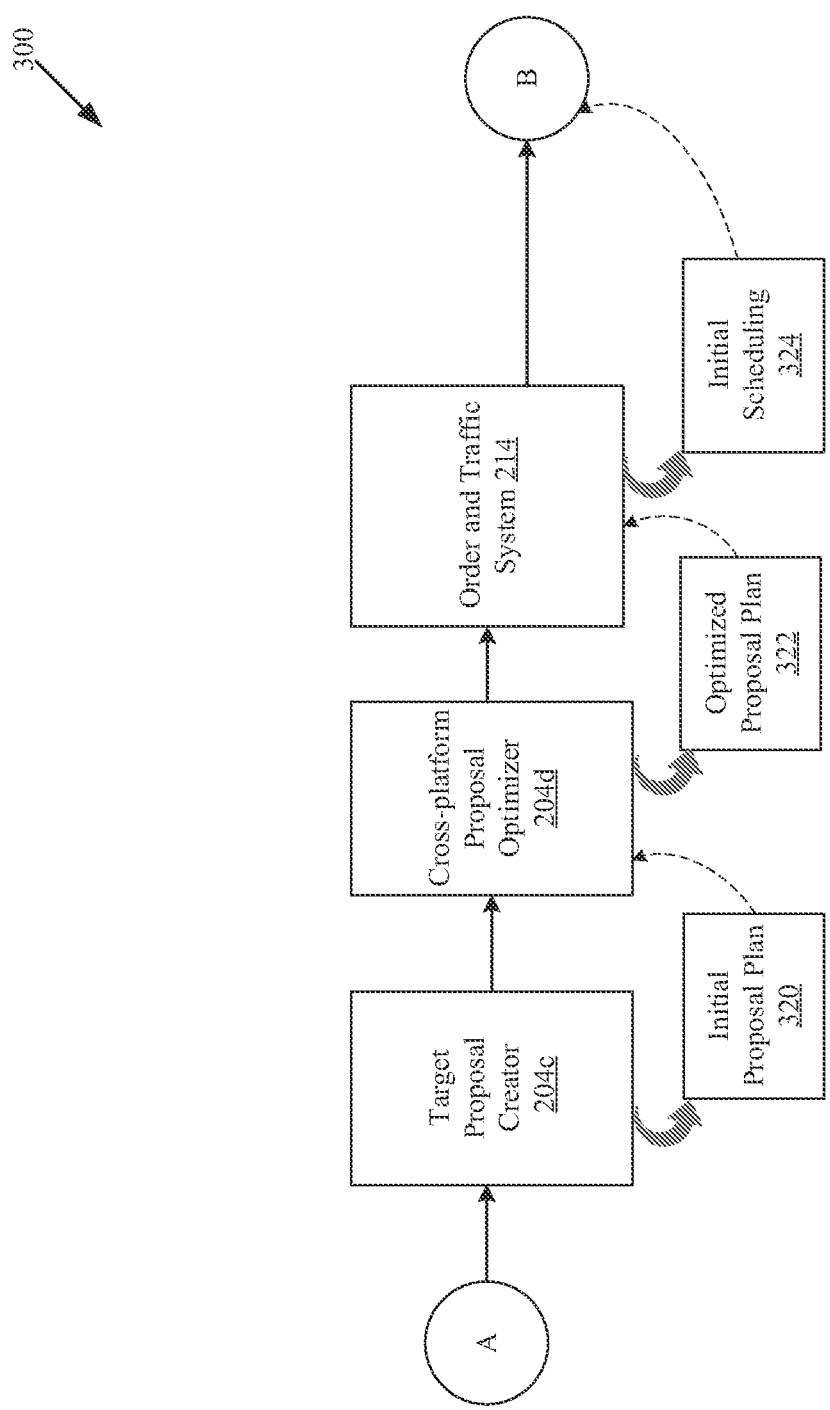
Figure 3C:
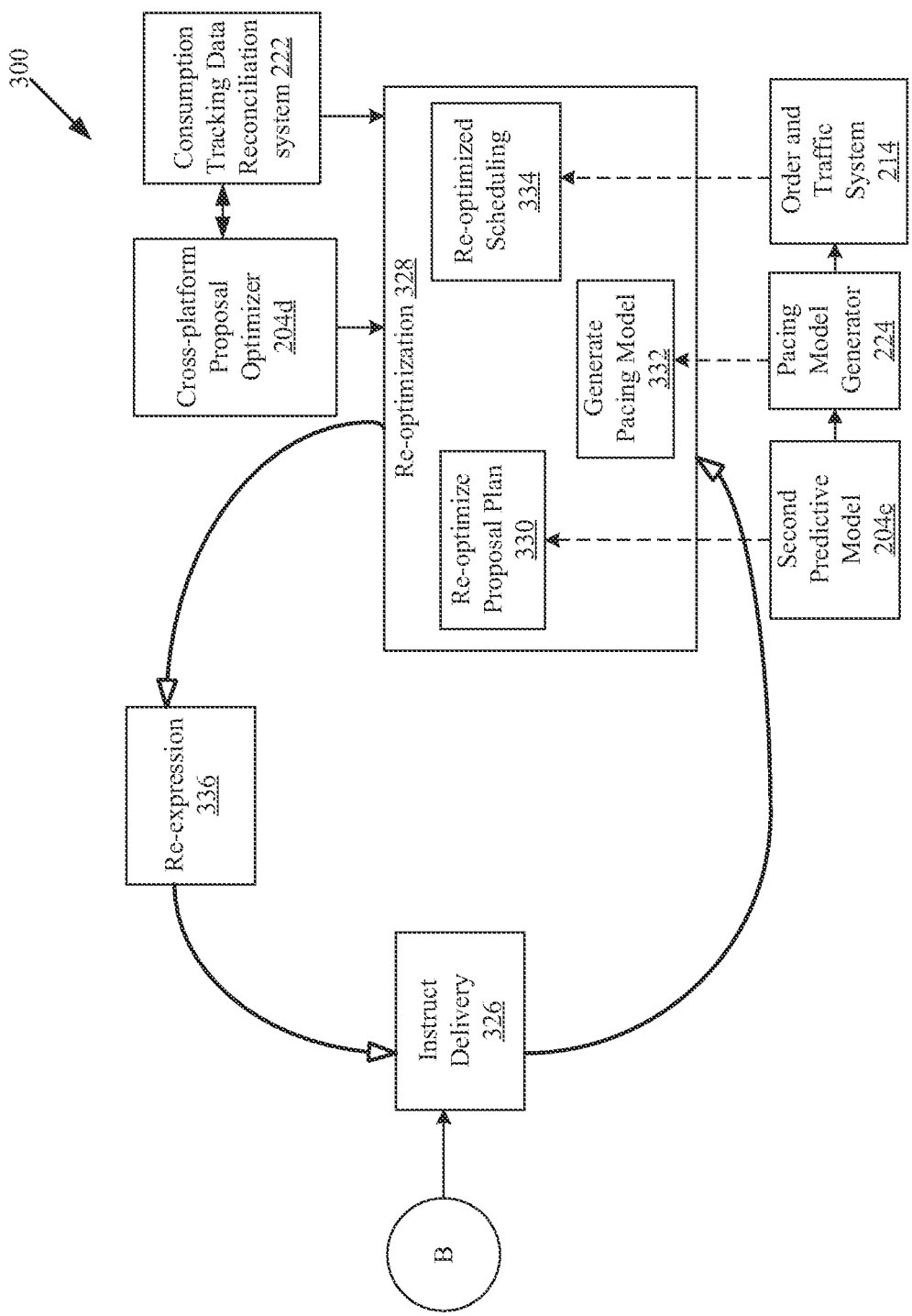

FIGS. 3A, 3B, and 3C illustrates an exemplary processing pipeline for cross-platform proposal creation, optimization, and re-optimization during a flight, in accordance with an embodiment of the disclosure. FIGS. 3A, 3B, and 3C are described in conjunction with elements from FIG. 1 and FIG. 2. With reference FIG. 3A, there is shown a processing pipeline 300.

At 302, the cross-platform management system 102 (FIG. 1) may be configured to receive, via the network interface 226, a request corresponding to a plurality of client-defined requirements to be achieved in a flight. The plurality of client-defined requirements may be received from a client from the one or more client terminals 108 via the communication network 120. The plurality of client-defined requirements corresponds to received input 302, such as a budget 304, a total duration of the flight (hereinafter simply referred to as a flight 306), a target audience 308, and one or more objectives to be achieved in the flight 306.

The one or more objectives (hereinafter simply referred to as objectives 310) to be achieved, include a cross-platform mix criteria 310a that indicates a requested or at least some distribution of the target audience 308 in a set of delivery platforms that are selected from the plurality of delivery platforms 104. The selection of the set of delivery platforms is also based on at least one of the plurality of client-defined requirements that indicate a client-desired mix of delivery platforms. The objectives 310 further include an expected outcome criteria 310b that indicates a reach to at least a threshold number of users of the target audience within the budget. In some cases, the expected outcome criteria 310b indicates a reach to a maximum number of users of the target audience within the budget during the flight 306. A cost efficiency criteria 310c of the objectives 310 is to achieve as much cost per thousand impression (CPM) reduction as possible while achieving other objectives during the flight 306. A gross impressions criteria 310d may be one of the objectives 310 that indicate total impressions (e.g., CPM) for the desired advertisement content to be achieved during the flight 306 across one or more delivery platforms of the plurality of delivery platforms 104. In some embodiments, one of the objectives 310 may be a receptivity criteria 310e that indicates how likely the consumers will watch and engage with a delivered advertisement content more attentively if the advertisement content is delivered at a specific time of day or scheduled to be displayed within a most viewed TV show, or a match or a degree of similarity of context between the advertisement content and a media stream in which the advertisement content is to be placed. For example, it may be expected that consumers will be more receptive to a product advertisement content, such as a truck, when such truck impressions are shown in an action movie as compared to a cartoon or a comedy movie. Consumers may be more receptive at certain times of day, for example, 6 PM to 11 PM, than morning 7 AM to 9 AM. In some embodiments, a client-defined requirement of the plurality of client defined requirements may correspond to a reach to maximum users of a specific income group or a specific characteristic of consumers, maximization of impressions from a specific number of users in a defined time duration, maximization of a revenue parameter, and minimization of a total penalty that may arise from deviations of goal values specified in the deals for advertisers and/or advertisement campaigns.

In accordance with an embodiment, audience data of each individual delivery platform of the plurality of delivery platforms 104 may be separately received from a plurality of different audience data sources, such as the audience data sources 114a, . . . , 114n, via the network interface 226. Such received audience data may not be uniform and compatible with each other. For example, one audience data source 114a may provide target audience data of age group 35-45 that falls in the income group of above 75,000 USD annual income, where some consumers are associated with corresponding set top box ID and whereas some other consumers are associated with both set top box ID and mobile ID. Another audience data source 114n may provide target audience data of age group 40-45 that falls in the income group of above 90,000 USD annual income, where each consumer is associated with mobile device ID. Thus, it may be difficult to utilize such audience data for planning and proposal creation and using such data may result in error.

At 312, the audience data processor 218 may be configured to determine an audience definition information that is consistent across the plurality of delivery platforms 104 based on the audience data of each individual delivery platform of the plurality of delivery platforms 104 received from the plurality of different audience data sources, such as the audience data sources 114a, . . . , 114n. The audience data processor 218 may be configured to store the audience definition information in the audience definition database 220.

At 314, the plurality of client-defined requirements (i.e., the received input), for example, the budget 304, the flight 306), the audience definition information that is consistent across the plurality of delivery platforms 104, and the objectives 310 to be achieved in the flight 306 (from 302), may be transformed to system acceptable values, as one or more request parameters. The one or more request parameters may include a cost constraint defined by the budget, a range constraint defined by the total duration of the flight, an audience characteristic constraint defined by the target audience, a video type or a banner type of the advertisement content, an order of preference for specified promotional slots for placement of the advertisement content, and different values associated with one or more criteria of the objectives 310. In some embodiments, the one or more request parameters may be stored with an associative relationship with the plurality of client-defined requirements in the proposal information system 204f. The proposal management system 204 may be configured to feed the one or more request parameters associated with the plurality of client-defined requirements and the audience definition information to the first predictive model 204a.

At 316, the first predictive model 204a may be configured to predict a count of users across a set of delivery platforms of the plurality of delivery platforms 104 over the flight 306. The count of users across the set of delivery platforms, may be predicted based on at least the determined audience definition information in the audience definition database 220. The output of the first predictive model 204a may be further provided to the cross-platform capacity estimator 204b.

At 318, the cross-platform capacity estimator 204b may be configured to determine an available capacity across the plurality of delivery platforms 104 at receipt of the request. The determined audience definition information, inventory information from each of the linear inventory management system 216a, the mobile inventory management system 216b, and the digital inventory management system 216c, and the predicted count of users across the selected set of delivery platforms of the plurality of delivery platforms 104 over the flight 306, provides an improved estimation of the available capacity. The inventory information indicates current booked inventory items or promotional opportunities for each individual delivery platform of the plurality of delivery platforms 104. Alternatively stated, the available capacity may be determined by subtracting the amount of inventory units that has been sold from the total inventory (total capacity), and where the flight 306 and the determined audience definition information indicates availability of desired target audience in accordance to the plurality of client-defined requirements.

With reference to FIG. 3B, there is shown the processing pipeline 300 in continuation to FIG. 3A. After the available capacity across the plurality of delivery platforms 104 is determined, the proposal management system 204 may activate the target proposal creator 204c. At 320, the target proposal creator 204c may be configured to initially create an interim proposal plan corresponding to the received request based on one or more request parameters. The interim proposal plan corresponds to at least a distribution of target audience across the set of delivery platforms of the plurality of delivery platforms 104. The target proposal creator 204c may be configured to create the interim proposal plan based on the determined available capacity across the plurality of delivery platforms 104. The interim proposal plan then may be provided to the cross-platform proposal optimizer 204d of the proposal management system 204.

At 322, the cross-platform proposal optimizer 204d may be configured to optimize the created interim proposal plan to generate a proposal plan that can be communicated to a client for acceptance before execution, via the one or more client terminals 108. The cross-platform proposal optimizer 204d may be configured to generate the proposal plan corresponding to the received request based on adjustment of the one or more request parameters with respect to a set of proposal parameters. The proposal plan includes the one or more request parameters (i.e., one or more objectives of the objectives 310 to be achieved during the flight 306, expected results (outcome), and a recommended mix. The recommended mix corresponds to an optimal distribution of target audience across a set of delivery platforms selected from the plurality of delivery platforms 104. Thus, some mix may be ensured once a historical capacity or historical delivery is known based on the analysis of the data received from the cross-platform capacity estimator 204b. This was not possible in traditional advertising campaign management on individual delivery platform separately. The generated proposal plan may then be communicated to a client device, via a client terminal of the one or more client terminals 108, for acceptance before execution and delivery of client-desired advertisement content. In case the acceptance is received for the generated proposal plan, the generated proposal plan is provided to the order and traffic system 214. In case the acceptance is not received for the generated proposal plan or rejected, for example, by a brand promoter or advertiser, additional input may be received from the client device via the client terminal. Further, the additional input may be then transformed to one or more additional request parameters like the operation 314 (FIG. 3A). The one or more additional request parameters may be added to the existing one or more request parameters and constraints. The generated proposal may then be further adjusted based on the newly added additional request parameters and send for acceptance again. In this regard, one or more iterations may occur in order to generate a finalized proposal.

At 324, the order and traffic system 214 may be configured to generate a schedule (i.e., an initial scheduling) based on the generated promotion plan, using the cross-platform scheduling and delivery control system 214b. The cross-platform scheduling and delivery control system 214b may be configured to book promotional slots (e.g., ad slots) and schedule placement of the advertisement content for a specified product across the selected set of delivery platforms at least for a first time period during the fight 306 in agreement to specified constraints in the set of proposal parameters, based on the generated proposal plan. The set of proposal parameters may correspond to a current availability of inventory items, price constraints, brand or content association constraints and the like.

With reference to FIG. 3C, there is shown the processing pipeline 300 in continuation to FIG. 3B. At 326, the cross-platform scheduling and delivery control system 214b may be configured to instruct delivery of advertisement content across each delivery platform of the set of delivery platforms at different booked promotional slots for the first time period, in accordance to the distribution of target audience across the set of delivery platforms in the generated proposal plan and the set of proposal parameters. Alternatively stated, the cross-platform scheduling and delivery control system 214b may be configured to execute the generated proposal plan for the first time period (e.g., week 1 of the flight 306) in the flight 306 on one or more delivery platforms of the set of delivery platforms in accordance with the plurality of client-defined requirements corresponding to the received request.

In accordance with an embodiment, during execution of the generated proposal plan for the first time period, consumption data of the delivered advertisement content may be received from a plurality of different service providers, such as the service providers 116a, . . . , 116n, at different time of day, at different frequency, and with different data structure for each time period, such as the first time period at this point, during the flight 306. In other words, consumption tracking data, e.g., number of impressions achieved for different devices may be received at different time of day. For example, consumption tracking data for mobile delivery platform, such as a smartphone, may be received 30 minutes previously whereas consumption tracking data for television may arrive only at end of day. Thus, it may be required to decide an optimal time to reconcile such data. The consumption tracking data reconciliation system 222 may be configured to reconcile consumption data for the advertisement content delivered at different delivery platforms across the set of delivery platforms. The reconciled consumption data is utilized to derive one or more results corresponding to the execution of the generated proposal plan with respect to the one or more client-defined requirements of the plurality of client-defined requirements. Based on the dynamic variations in consumption of promotional opportunities associated with the set of inventory items, the execution of the generated proposal plan may deviate from achieving the one or more client requirements with discrete bins of time during the flight 306 of the generated proposal plan. The cross-platform management system 102 may be configured to track an actual delivery of the advertisement content across each delivery platform of the set of delivery platforms for the first time period in accordance to the distribution of target audience across the set of delivery platforms and one or more client-defined requirements of the plurality of client-defined requirements associated with the generated proposal plan. The cross-platform management system 102 may be configured to measure a deviation in the derived one or more results across the set of delivery platforms for the first time period in the flight during the execution of the generated proposal plan, based on the reconciled data.

At 328, re-optimization is executed after actual delivery beings for the first time period. At 330, the cross-platform proposal optimizer 204d may be configured to re-optimize the generated proposal plan for a second time period (e.g., week 2 or "t-1" of FIG. 4) in the flight 306 by an in-flight re-distribution of the target audience across the set of delivery platforms. The in-flight re-distribution of audience across the set of delivery platform is executed based on the measured deviation in one or more client-defined requirements of the plurality of client-defined requirements during execution of the generated proposal plan for the first time period (e.g., in the week 1 or "t-2" of FIG. 4). For the re-optimization, the second predictive model 204e may be configured to forecast the re-distribution of the target audience across the set of delivery platforms for the second time period based on the reconciled consumption data for previous time period (i.e., the first time period). For example, if the results impressions on the television delivery platform is detected low and the impressions on the mobile delivery platform is detected high than planned then more impressions may be pushed for the television delivery platform for the second time period and comparatively lower impressions may be targeted for the mobile delivery platform for the second time period. At 332, a pacing model is generated by the pacing model generator 224. An example of the pacing model is shown and described, for example, in FIG. 4.

At 334, the order and traffic system 214 may be configured to re-allocate and re-schedule advertisement content across each delivery platform of the set of delivery platforms at different promotional slots (e.g., ad slots or advertisement content placement opportunities) for the second time period in accordance to the in-flight re-distribution of the target audience across the set of delivery platforms and the set of proposal parameters. The re-scheduling is done to control execution of the re-optimized proposal plan for the second time period in the flight and to align to the one or more client-defined requirements of the plurality of client-defined requirements.

At 336, the cross-platform scheduling and delivery control system 214*b* may be configured to re-express the advertisement content based on the re-scheduling in accordance with the re-optimized generated proposal plan for the second time period. The re-expression corresponds to controlled execution of the re-optimized proposal plan for the second time period in the flight on one or more delivery platforms of the set of delivery platforms in accordance with the re-optimized proposal plan to align with the one or more client-defined requirements. In the re-expression, the order modification system 214*a* of the order and traffic system 214 may be configured to change the attributes associated with an order for the re-scheduling and accordingly add one or more additional inventory units for one delivery platform while deleting one or more inventory units from inventory for another delivery platform to cause the execution of the re-optimization. The inventory units correspond to promotional slots, e.g., ad slots, and promotional opportunities where the advertisement content can be inserted for consumption.

In accordance with an embodiment, the order and traffic system 214 may be configured to re-allocate, re-schedule, and re-instruct modified delivery and clearing of the advertisement content across each delivery platform of the set of delivery platforms at different promotional slots for the second time period. Such re-allocation, re-scheduling, and re-instruction for modified delivery of advertisement content may be done for the controlled execution of the re-optimized proposal plan for the second time period in the flight and to align to the one or more client-defined requirements of the plurality of client-defined requirements. Thus, a continuous cycle of optimization and re-optimization for each time period during the flight 306 is executed to achieve at least one or more given objectives (e.g., the objectives 310).

FIG. 4 illustrates an exemplary pacing model, in accordance with an embodiment of the disclosure. FIG. 4 is described in conjunction with elements from FIGS. 1, 2, and 3A to 3C. In accordance with an embodiment, the pacing model generator 224 may be configured to generate a pacing model 402 that indicates a difference in achieved consumption of advertisement content against a planned delivery of the advertisement content during execution of the generated proposal plan for the first time period (e.g., "t−2"), and subsequent time periods (t−1, t, t+1, t+2, . . . , t+n) during the flight 306 to be achieved, based on the measured deviation in the derived one or more results across the set of delivery platforms of the plurality of delivery platforms 104. For example, for the first time period (represented as "t−2") in the flight 306, the distribution of the target audience (i.e., actual obtained results) may be "50%", "30%", and "20%" for the television (also represented as medium 1 "M1"), mobile (also represented as medium 2 "M2") desktop (also represented as medium 3 "M3") delivery platforms respectively for the first time period (i.e., "t−2" or week 1 of the flight 306). The original recommended mix in accordance to the generated proposal plan may be "40%", "35%", and "25%" for the television ("M1"), mobile ("M2"), desktop ("M3") delivery platforms respectively for the first time period ("t−2"). Thus, impressions for television ("M1") is planned to be reduced by 10%, increased for mobile by "5%" by percentage share), and increase for desktop ("M3") too by 5% in re-optimized plan. Again, the actual results obtained may be 45%", "40%", and "15%" for television ("M1"), mobile ("M2"), and desktop ("M3") respectively at "t−1", as shown. Thus, the proposal plan may be optimized and re-optimized for different time periods (t, t+1, t+2, . . . t+n) based on measured deviation in the obtained one or more results across the set of delivery platforms for the different time periods of the flight 306 of execution of the generated proposal plan.

FIG. 5 is a graph that illustrates a time variant in-flight distribution of target audience on a selected set of delivery platforms, in accordance with an embodiment of the disclosure. With reference to FIG. 5, there is shown a graph 500 of a proposal plan on a television delivery platform, a mobile delivery platform, and a desktop delivery platform during execution for a given flight, such as the flight 306. The graph 500 may be represented as a plot of the percent target audience for each delivery platform for the flight 306. The flight 306 may correspond to a continuous point in time or a discrete bin of time. The distribution of the target audience may be assigned as, for example, "50%", "30%", and "20%" for the television, mobile and desktop delivery platforms respectively for the first time period (i.e., "t−2" (FIG. 4) or week 1 of the flight 306). The distribution for each delivery platform may vary with time with respect to a straight line parallel to flight axis 502 (constant distribution). The cross-platform proposal optimizer 204*d* (FIG. 2A) may modify the distribution with time to balance the client-defined requirements and the availability of promotional opportunities within the inventory items or the selected set of delivery platforms. The generated distribution may be optimally achieved at the end of the flight 306. The cumulative or total distribution of the target audience may be achieved as "40%", "35%", and "25%" for the television, mobile and desktop delivery platforms respectively during the entire duration of the flight 306 in accordance to the ensured mix and the plurality of client-defined requirements.

FIGS. 6A, 6B, 6C, and 6D, collectively, is a flow chart that illustrates exemplary operations for cross-platform proposal and deal management, in accordance with an embodiment of the disclosure. A flowchart 600 may be described in conjunction with detailed description of FIGS. 1, 2, 3A to 3C, 4, 5, and 6A to 6D. The operations of the flowchart 600 may be executed in the cross-platform management system 102, where the operations start at 602 and proceeds to 604.

At 602, a request corresponding to a plurality of client-defined requirements to be achieved in a flight may be received. The request corresponding to the plurality of client-defined requirements may be associated with one or more request parameters. The proposal management system 204 may be configured to receive the request corresponding to the plurality of client-defined requirements. An example of the plurality of client-defined requirements has been shown and described in FIG. 3A. In accordance with an embodiment, the plurality of client-defined requirements may also correspond to a reach to maximum users of a specific income group, maximization of impressions from a specific number of users in a flight, maximization of a revenue parameter, and minimization of a total penalty that may arise from deviations of goal values specified in the deals for advertisers and/or advertisement campaigns.

At 604, the plurality of client-defined requirements may be transformed to the one or more request parameters that are acceptable as input to a processing system, such as the proposal management system 204. The cross-platform management system 102 may be configured to transform the plurality of client-defined requirements to the one or more request parameters that are acceptable as input. The request for the corresponding one or more client-defined requirements may associated with the one or more request parameters.

At 606, audience data may be received for each individual delivery platform of the plurality of delivery platforms 104 and associated devices (e.g., the plurality of devices 106) from plurality of audience data sources, such as audience data sources 114a, . . . , 114n. The audience data processor 218 may be configured to receive and process the audience data.

At 608, audience definition information that is consistent across the plurality of delivery platforms 104 may be determined based on audience data of each individual delivery platform of the plurality of delivery platforms 104 received from a plurality of audience data sources, such as the audience data sources 114a, . . . , 114n. The audience data processor 218 may be configured to determine the audience definition information that is consistent across the plurality of delivery platforms 104. The audience definition information, for example, has been described in FIGS. 2 and 3A.

At 610, a count of users across a set of delivery platforms of the plurality of delivery platforms 104 over the flight (e.g., the flight 306) may be predicted based on the determined audience definition information. The set of delivery platforms may be selected in accordance to a mix of different delivery platforms requested in the plurality of client-defined requirements. The first predictive model 204a may be configured to determine the count of users across the set of delivery platforms of the plurality of delivery platforms 104 over the flight.

At 612, an available capacity across the plurality of delivery platforms 104 may be determined at receipt of the request, based on the determined audience definition information and inventory information. The inventory information indicates current booked inventory items and promotional opportunities for each individual delivery platform of the plurality of delivery platforms 104. The cross-platform capacity estimator 204b may be configured to determine the available capacity across the plurality of delivery platforms 104 based on the determined audience definition information and the inventory information retrieved from the linear inventory management system 216a, the mobile inventory management system 216b, and the digital inventory management system 216c. Alternatively stated, the cross-platform capacity estimator 204b may be configured to predict ad impressions that can be delivered to a specific device associated with a user or multiple devices associated with different target users.

At 614, a set of proposal parameters associated with the one or more request parameters may be retrieved from the proposal information system 204f. In accordance with an embodiment, the proposal management system 204 may be configured to retrieve the set of proposal parameters. The set of proposal parameters may correspond to availability of inventory items, price constraints, brand or content association constraints and the like.

At 616, the one or more request parameters may be adjusted with respect to the retrieved set of proposal parameters. In accordance with an embodiment, the proposal management system 204 may be configured to adjust the one or more request parameters associated with the one or more client-defined requirements with respect to the retrieved set of proposal parameters. The adjustment of the one or more request parameters may be based on one or more checks, negotiation, and validation of an availability of inventory items, promotional opportunities, and constraints, as discussed, for example, in FIG. 2.

At 618, a proposal plan may be generated based on adjustments of the one or more request parameters with respect to the set of proposal parameters. The proposal management system 204 may be configured to generate the proposal plan based on adjustments of the one or more request parameters associated with one or more client-defined requirements. The proposal plan may correspond to at least a distribution of target audience (i.e., a recommended mix) across the set of delivery platforms of the plurality of delivery platforms 104.

At 620, the generated proposal plan may be communicated to a client device, via a client terminal, for acceptance before execution and delivery of advertisement content on the set of delivery platforms. The cross-platform deal management system 206 may be configured to communicate the generated proposal plan to the client device. The client device may be operated by a client, such as an advertiser, a brand promoter, or a client-side person responsible to manage an advertising campaign.

At 622, it may be checked whether an acceptance on the generated proposal plan is received. The cross-platform deal management system 206 may be configured to receive the acceptance on the generated proposal plan from client before execution and delivery of the advertisement content on the selected set of delivery platforms of the plurality of delivery platforms 104. In case of non-acceptance, the generated proposal plan may be negotiated, as discussed in FIGS. 1, 2, and 3B and the control passes to 624. In cases where the acceptance is received, the control passes to 626.

At 624, additional input may be received from the client device via the client terminal (of the one or more client terminals 108). The additional input may also be transformed to one or more additional request parameters (e.g., similar to operation at 604). The control may return to 616, where the additional request parameters are further adjusted.

At 626, the generated proposal plan (or the negotiated/finalized proposal plan) may be executed for a first time period in the flight on the set of delivery platforms in accordance with plurality of client-defined requirements corresponding to received request. The cross-platform deal management system 206 may be configured to execute the generated proposal plan based on acceptance of the generated proposal plan.

At 628, the advertisement content may be allocated and scheduled across each delivery platform of set of delivery platforms at different promotional slots for the first time period, in accordance to distribution of target audience across set of delivery platforms during execution of the generated proposal plan. The order and traffic system 214 may be configured to allocate and schedule the advertisement content across each delivery platform of set of delivery platforms using the cross-platform scheduling and delivery control system 214b

At 630, delivery of the advertisement content across each delivery platform of set of delivery platforms at different promotional slots for the first time period, may be instructed based on the scheduling in accordance to the generated proposal plan. The cross-platform scheduling and delivery control system 214b may be configured to instruct delivery of the advertisement content across each delivery platform of set of delivery platforms at different promotional slots for the first time period.

At 632, consumption data for the advertisement content delivered at different delivery platforms across the set of delivery platforms may be reconciled. The consumption data may be received from a plurality of different service providers, such as the service providers 116a, . . . , 116n at different time of day, at different frequency, and with different data structure for the first time period. The consumption tracking data reconciliation system 222 may be configured to reconcile the consumption data for the advertisement content delivered at different delivery platforms across the set of delivery platforms received from the service providers 116a, . . . , 116n.

At 634, an actual delivery of the advertisement content may be tracked across each delivery platform of the set of delivery platforms for the first time period in accordance with the distribution of target audience across the set of delivery platforms and one or more client-defined requirements of the plurality of client-defined requirements associated with the generated proposal plan. The cross-platform management system 102 may be configured to track the actual delivery or forecasted delivery of the advertisement content across each delivery platform of the set of delivery platforms for the first time period in accordance to the distribution of target audience across the set of delivery platforms and the reconciled consumption data.

At 636, one or more results corresponding to execution of the generated proposal plan with respect to one or more client-defined requirements of plurality of client-defined requirements may be obtained. The one or more results may be obtained based on at least the reconciled consumption data and the tracked actual delivery of advertisement content. The cross-platform scheduling and delivery control system 214b may be configured to obtain the one or more results corresponding to the execution of the proposal plan. The obtained one or more results may be delivered to the cross-platform proposal optimizer 204d, as discussed in FIG. 3C.

At 638, a deviation in the obtained one or more results across the set of delivery platforms for each time period in flight during execution of generated proposal plan, may be measured based on the reconciled data. The cross-platform deal management system 206 may be configured to measure the deviation in the obtained one or more results across the set of delivery platforms for specific points of time during the flight of execution of the proposal plan.

At 640, a pacing model may be generated that indicates a difference in achieved consumption of the advertisement content against a planned delivery of the advertisement content during execution of the generated proposal plan for the first time period, based on the measured deviation in the obtained one or more results across the set of delivery platforms. The pacing model generator 224 may be configured to generate the pacing model.

At 642, one or more control factors may be identified to control the deviation in the one or more client-defined requirements of the plurality of client-defined requirements in the next time period in future (e.g., the second time period) that is subsequent to the previous time period (e.g., the first time period) in the flight. The proposal management system 204 may be configured to identify the one or more control factors based on the generated pacing model and the measured deviation in the obtained one or more results during execution of the generated proposal plan. This enables a controlled and balanced achievement of the plurality of client-defined requirements.

At 644, an in-flight mix that corresponds to in-flight re-distribution of the target audience across the set of delivery platforms, may be generated. The cross-platform optimizer 204d may be configured to generate the in-flight mix that corresponds to in-flight re-distribution of the target audience across the set of delivery platforms based on the identified one or more control factors.

At 646, the previously generated proposal plan may be re-optimized for a second time period in flight based on the generated in-flight mix. The cross-platform optimizer 204d may be configured to re-optimize the previously generated proposal plan. An example of the re-optimization (at 328) has been described, for example in FIGS. 3C, 4, and 5.

At 648, an execution of the re-optimized proposal plan may be controlled on one or more delivery platforms of the set of delivery platforms for a next time period in flight in accordance with the re-optimized proposal plan to align with one or more client-defined requirements of the plurality of client-defined requirements. The cross-platform deal management system 206 may be configured to execute the re-optimized proposal plan on one or more delivery platforms of the set of delivery platforms for the next time period (e.g., the second time period) in flight in accordance with the re-optimized proposal plan.

At 650, a re-allocation, a re-scheduling, and re-instruction for modified delivery of advertisement content across each delivery platform of the set of delivery platforms at different promotional slots for the second time period may be done in accordance to the generated in-flight re-distribution and clearing of the target audience across the set of delivery platforms and the set of proposal parameters. The order and traffic system 214 may be configured to re-allocate, re-schedule, and re-instruct modified delivery of the advertisement content across each delivery platform of the set of delivery platforms at different promotional slots for the second time period. Such re-allocation, re-scheduling, and re-instruction for modified delivery of advertisement content may be done for the controlled execution of the re-optimized proposal plan for the second time period in the flight and to align to the one or more client-defined requirements of the plurality of client-defined requirements.

At 652, it may be checked or determined whether the re-optimization is executed for all time periods in the flight. In cases where a periodic or continuous re-optimization is executed for all time periods in the flight (e.g., the flight 306), the control ends thereafter. In cases where one or more time periods are remaining for re-optimization to be executed during the flight, the control returns to 632 of FIG. 6C. The operations 632 to 652 may be repeated until results from a previous time periods are obtained, and re-optimization is executed for all time periods in the flight.

Figure 7:
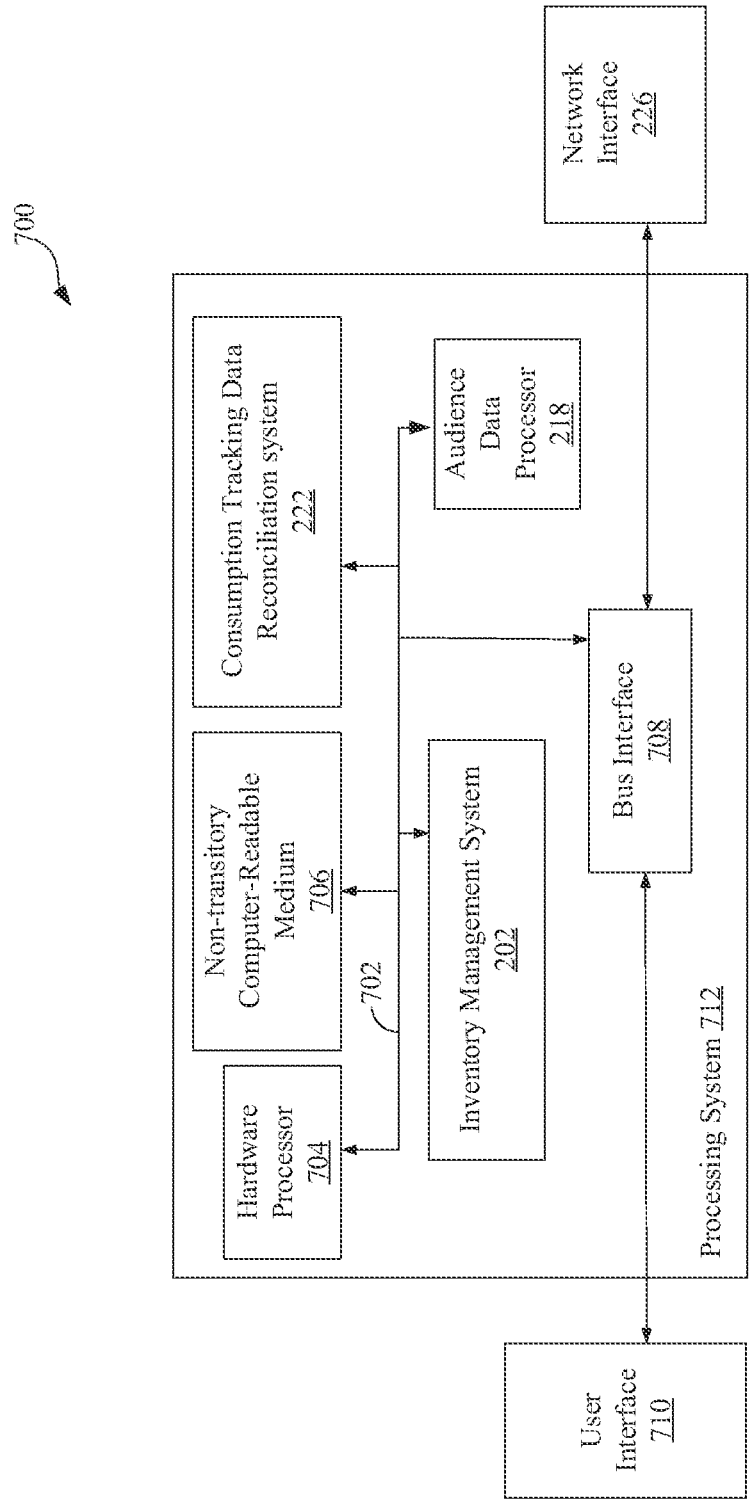
FIG. 7 is a conceptual diagram illustrating an example of a hardware implementation for an exemplary cross-platform management system employing a processing system for creation, optimization, and re-optimization of proposal plan for given client-requirements, in accordance with an exemplary embodiment of the disclosure.

FIG. 7 is a conceptual diagram illustrating an example of a hardware implementation for an exemplary cross-platform management system employing a processing system for creation, optimization, and re-optimization of proposal plan for given client-requirements, in accordance with an exemplary embodiment of the disclosure. Referring to FIG. 7, the hardware implementation 700 for the cross-platform management system 102 of FIG. 1 employs a processing system 712 for proposal creation, optimization, and re-optimization in accordance with the plurality of client-defined requirements, as described herein. In some examples, the processing system 712 may comprise one or more hardware processors 704, an inventory management component, such as the inventory management system 202, the audience data processor 218, a consumption tracking data reconciliation component, such as the consumption tracking data reconciliation system 222, and the network interface 226.

In this example, the cross-platform management system 102 employing the processing system 712 may be implemented with a bus architecture or other communication medium, represented generally by the bus 702. The bus 702 may include any number of interconnecting buses and bridges depending on the specific implementation of the cross-platform management system 102 and the overall design constraints. The bus 702 links together various circuits including one or more processors, represented by the hardware processor 704, a non-transitory computer-readable media, represented by the non-transitory computer-readable medium 706, the inventory management system 202, the audience data processor 218, the consumption tracking data reconciliation component, such as the consumption tracking data reconciliation system 222, and the network interface 226, which in combination may be configured to carry out one or more methods or procedures described herein.

A bus interface 708 provides an interface between the bus 702 and the network interface 226. The network interface 226 provides a means for communicating via the communication network 120 with various other apparatus, such as the audience data sources 114a, . . . , 114n, the service providers 116a, . . . , 116n, the one or more terminals 108, and the plurality of delivery platforms 104 (FIG. 1). The user interface 710 (e.g., keypad, display, speaker, microphone, pointing device, or graphical user interface, a human-machine hardware interface) may also be provided to enable a user to interact with the cross-platform management system 102 (FIG. 1). In accordance with an aspect of the disclosure, the user interface 710 may enable user interaction with the cross-platform management system 102. For example, the user interface 710 may be utilized to enter administration (admin) and/or configuration parameters.

The processor 704 may be operable to manage the bus 702 and processing, including the execution of software stored on the non-transitory computer-readable medium 706. In accordance with an embodiment of the disclosure, the processor 704 may be configured to control the operation of the cross-platform management system 102 (FIG. 1) and may be configured to coordinate operation amongst the components therein, as well as with entities external to the cross-platform management system 102. The software, when executed by the hardware processor 704, causes the cross-platform management system 102 to perform the various functions and/or operations described in FIG. 1, 2, 3A to 3C, 4, 5, 6A to 6D, for any particular apparatus. The non-transitory computer-readable medium 706 may also be used for storing data that is manipulated by the hardware processor 704 when executing software.

In an aspect, the hardware processor 704 (also simply referred to as one or more circuits, circuitry, processor, or one or more processors), the non-transitory computer-readable medium 706, or a combination of both may be configured or otherwise specially programmed to perform the functionality of the inventory management system 202 (including the various components of the inventory management system 202, such as the proposal management system 204, the cross-platform deal management system 206, and the order and traffic system 214, as described in FIG. 2), the audience data processor 218, and the consumption tracking data reconciliation system 222 (which are illustrated in FIG. 2). For example, the processor 704, the computer-readable medium 906, or a combination of both may be configured or otherwise specially programmed to perform the functionality of the various components of the cross-platform management system 102 as described in FIGS. 1, 2, 3A to 3C, 4, 5, and 6A to 6D (e.g., the operations 602 to 652 of flowchart 600 (FIG. 6A to 6D) or the operations in the processing pipeline 300 (FIG. 3A to 3C)).

The cross-platform management system 102 operates faster and more efficiently to accommodate proposal creation, optimization, and re-optimization, across the plurality of delivery platforms 104 at the same time or concurrently and can operate to efficiently and optimally process impressions and in-flight distribution of target audience which range from hundreds, thousands, to millions in number. The concurrent operations to manage the plurality of client-defined requirements across the plurality of delivery platforms 104 including capacity estimation, audience definition determination for accurate distribution of target audience during a flight produces a synergistic effect and may utilize less memory, than would otherwise be required resulting in much faster processing time. With regards to synergistic effects, it is observed that consumers exposed to advertisement content on television, and paired media of television, on Internet, and mobile applications, have greater perceived message credibility, ad credibility, and brand credibility than counterparts exposed to repetitive ads from a single delivery medium or platform.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein.

The present disclosure may also be embodied in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in random access memory (RAM) memory, flash memory, read only memory (ROM) memory, erasable programmable read-only memory (EPROM) memory, electrically erasable programmable read-only memory (EEPROM) memory, registers, hard disk, physical and/or virtual disk, a removable disk, a compact disc read-only-memory (CD-ROM), virtualized system or device such as a virtual sever or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system comprising memory and one or more processors communicatively coupled to the memory, the one or more processors configured to:
   generate a proposal plan associated with a plurality of proposal parameters and a distribution of a target audience across a set of delivery platforms of a plurality of delivery platforms;
   receive consumption data associated with an execution of the proposal plan during a first duration a total duration of network time, wherein the consumption data is associated with multiple delivery platforms of the plurality delivery platforms;
   generate an adjusted proposal plan based at least in part on the consumption data and by updating the distribution of the target audience across the set of delivery platforms to align with the plurality of proposal parameters; and
   initiate execution of the adjusted proposal plan during a second duration of the total duration of network time.

2. The system of claim 1, wherein the one or more delivery platforms comprises those delivery platforms of the plurality of delivery platforms selected in accordance with the plurality of proposal parameters.

3. The system of claim 1, wherein a delivery platform of the plurality of delivery platforms comprises a linear delivery platform, a mobile delivery platform, or a digital delivery platform.

4. The system of claim 1, wherein the plurality of proposal parameters comprises one or more of a budget, the total duration of network time, the target audience, or an objective.

5. The system of claim 4, wherein the objective comprises one of a requested distribution of the target audience in the set of delivery platforms, an expected outcome criteria that indicates a reach to a threshold number of users of the target audience within the budget, a cost efficiency criteria to achieve the objective, a gross impressions criteria, or a receptivity criteria.

6. The system of claim 1, wherein the plurality of proposal parameters is associated with one or more of a reach of a brand, a cause, a service, a campaign to the target audience, or a specific number of impressions from the target audience.

7. The system of claim 2, wherein generating the proposal plan is based at least in part on a first predictive model configured to predict a count of users across the set of delivery platforms over the total duration of network time.

8. The system of claim 1, wherein generating the adjusted proposal plan is based at least in part on actual delivery of content during the first duration of network time.

9. The system of claim 1, wherein generating the proposal plan comprises estimating available capacity across the plurality of delivery platforms in accordance with the plurality of proposal parameters.

10. One or more non-transitory computer-readable storage media including instructions that, when executed by one or more processors, cause the one or more processors to:
generate a proposal plan associated with a plurality of proposal parameters and a distribution of a target audience across one or more delivery platforms of a plurality of delivery platforms;
receive consumption data associated with an execution of the proposal plan during a first duration a total duration of network time, wherein the consumption data is associated with multiple delivery platforms of the plurality delivery platforms;
generate an adjusted proposal plan based at least in part on the consumption data and by updating the distribution of the target audience across the set of delivery platforms to align with the plurality of proposal parameters; and
initiate execution of the adjusted proposal plan during a second duration of the total duration of network time.

11. The one or more non-transitory computer-readable storage media of claim 10, wherein the one or more delivery platforms comprise those delivery platforms of the plurality of delivery platforms selected in accordance with the plurality of proposal parameters.

12. The one or more non-transitory computer-readable storage media of claim 10, wherein a delivery platform of the plurality of delivery platforms comprises a linear delivery platform, a mobile delivery platform, or a digital delivery platform.

13. The one or more non-transitory computer-readable storage media of claim 10, wherein the plurality of proposal parameters comprises one or more of a budget, the total duration of network time, the target audience, or an objective.

14. The one or more non-transitory computer-readable storage media of claim 13, wherein the objective comprises one of a requested distribution of the target audience in the set of delivery platforms, an expected outcome criteria that indicates a reach to a threshold number of users of the target audience within the budget, a cost efficiency criteria to achieve the objective, a gross impressions criteria, or a receptivity criteria.

15. The one or more non-transitory computer-readable storage media of claim 10, wherein the plurality of proposal parameters is associated with one or more of a reach of a brand, a cause, a service, a campaign to the target audience, or a specific number of impressions from the target audience.

16. The one or more non-transitory computer-readable storage media of claim 10, wherein generating the proposal plan is based at least in part on a first predictive model configured to predict a count of users across the set of delivery platforms over the total duration of network time.

17. The one or more non-transitory computer-readable storage media of claim 10, wherein generating the adjusted proposal plan is based at least in part on actual delivery of content during the first duration of network time.

18. The one or more non-transitory computer-readable storage media of claim 10, wherein generating the proposal plan comprises estimating available capacity across the plurality of delivery platforms in accordance with the plurality of proposal parameters.

19. A computer-implemented method comprising:
generating, by one or more processors, a proposal plan associated with a plurality of proposal parameters and a distribution of a target audience across one or more delivery platforms of a plurality of delivery platforms;
receiving, by the one or more processors, consumption data associated with an execution of the proposal plan during a first duration a total duration of network time, wherein the consumption data is associated with multiple delivery platforms of the plurality delivery platforms;
generating, by the one or more processors, an adjusted proposal plan based at least in part on the consumption data and by updating the distribution of the target audience across the set of delivery platforms to align with the plurality of proposal parameters; and
initiating, by the one or more processors, execution of the adjusted proposal plan during a second duration of the total duration of network time.

* * * * *

UNITED STATES PATENT AND TRADEMARK OFFICE
CERTIFICATE OF CORRECTION

| | | |
|---|---|---|
| PATENT NO. | : 12,086,841 B2 | Page 1 of 1 |
| APPLICATION NO. | : 18/322202 | |
| DATED | : September 10, 2024 | |
| INVENTOR(S) | : Wassim Samir Chaar et al. | |

It is certified that error appears in the above-identified patent and that said Letters Patent is hereby corrected as shown below:

On the Title Page

Item (72), Inventors, Line 7, delete "Cordlandt" and insert -- Cortlandt --, therefor.

In the Claims

In Column 35, Line 21, Claim 7, delete "claim 2," and insert -- claim 1, --, therefor.

Signed and Sealed this
Seventh Day of January, 2025

Derrick Brent
*Acting Director of the United States Patent and Trademark Office*